US012682247B2

(12) United States Patent
Nair et al.

(10) Patent No.: US 12,682,247 B2
(45) Date of Patent: Jul. 14, 2026

(54) EXPLOITING DOMAIN-SPECIFIC LANGUAGE CHARACTERISTICS FOR LANGUAGE MODEL PRETRAINING

(71) Applicant: ADOBE INC., San Jose, CA (US)

(72) Inventors: Inderjeet Jayakumar Nair, Bengaluru (IN); Natwar Modani, Bangalore (IN)

(73) Assignee: ADOBE INC., San Jose, CA (US)

( * ) Notice: Subject to any disclaimer, the term of this patent is extended or adjusted under 35 U.S.C. 154(b) by 735 days.

(21) Appl. No.: 18/181,044

(22) Filed: Mar. 9, 2023

(65) Prior Publication Data

US 2024/0303496 A1 Sep. 12, 2024

(51) Int. Cl.
*G06F 40/279* (2020.01)
*G06N 3/0895* (2023.01)

(52) U.S. Cl.
CPC ......... *G06N 3/0895* (2023.01); *G06F 40/279* (2020.01)

(58) Field of Classification Search
CPC ....... G06N 5/048; G06N 3/043; G06F 40/279
See application file for complete search history.

(56) References Cited

U.S. PATENT DOCUMENTS 11,805,185 B2 * 10/2023 Tongya .................... G06F 40/35
2020/0279171 A1 * 9/2020 Mazzoleni .............. G06F 16/36
2023/0237260 A1 * 7/2023 Yoon .................... G06N 3/0455 704/9
2023/0335122 A1 * 10/2023 Biadsy ..................... G06N 3/04

OTHER PUBLICATIONS

Alsentzer, et al, "Publicly Available Clinical BERT Embeddings", arXiv preprint: arXiv:1904.03323v3 [cs.CL] Jun. 20, 2019, 7 pages.
Borchmann, et al, "Contract Discovery: Dataset and a Few-Shot Semantic Retrieval Challenge with Competitive Baselines", arXiv preprint: arXiv:1911.03911v2 [cs.CL] Oct. 8, 2020, 15 pages.
Broder, "On the resemblance and containment of documents", Proceedings of the International Conference on Compression and Complexity of Sequences, 10.1109/SEQUEN.1997.666900, 1997, 9 pages.
Chalkidis, et al, "Large-Scale Multi-Label Text Classification on EU Legislation", arXiv preprint: arXiv:1906.02192v1 [cs.CL] Jun. 5, 2019, 9 pages.

(Continued)

*Primary Examiner* — Thomas H Maung
(74) *Attorney, Agent, or Firm* — F. CHAU & ASSOCIATES, LLC

(57) ABSTRACT

A method, apparatus, non-transitory computer readable medium, and system of training a domain-specific language model are described. One or more aspects of the method, apparatus, non-transitory computer readable medium, and system include obtaining domain-specific training data including a plurality of domain-specific documents having a document structure corresponding to a domain, and obtaining domain-agnostic training data including a plurality of documents outside of the domain. The domain-specific training data and the domain-agnostic training data are used to train a language model to perform a domain-specific task based on the domain-specific training data and to perform a domain agnostic task based on the domain-agnostic training data.

18 Claims, 12 Drawing Sheets

(56) References Cited

OTHER PUBLICATIONS

Chalkidis, et al, "Legal-BERT: The Muppets straight out of Law School", arXiv preprint: arXiv:2010.02559v1 [cs.CL] Oct. 6, 2020, 7 pages.
Chalkidis, et al, "MultiEurlex—A multi-lingual and multi-label legal document classification dataset for zero-shot cross-lingual transfer", arXiv preprint: arXiv:2109.00904v2 [cs.CL] Sep. 6, 2021, 23 pages.
Devlin, et al, "BERT: Pre-training of Deep Bidirectional Transformers for Language Understanding", arXiv preprint: arXiv:1810.04805v2 [cs.CL] May 24, 2019, 16 pages.
Gralinski, et al, "GEval: Tool for Debugging NLP Datasets and Models", Proceedings of the Second BlackboxNLP Workshop on Analyzing and Interpreting Neural Networks for NLP, pp. 254-262 Florence, Italy, Aug. 1, 2019, 9 pages.
Gu, et al, "Domain-Specific Language Model Pretraining for Biomedical Natural Language Processing", arXiv preprint: arXiv:2007.15779v6 [cs.CL] Sep. 16, 2021, 24 pages.
He, et al, "Deberta: Decoding-Enhanced Bert with Disentangled Attention", arXiv preprint: arXiv:2006.03654v6 [cs.CL] Oct. 6, 2021, 23 pages.
Hendrycks et al, "Cuad: An Expert-Annotated NLP Dataset for Legal Contract Review," arXiv preprint: arXiv:2103.06268v2 [cs.CL] Nov. 8, 2021, 15 pages.
Lee, et al, "BioBERT: a pre-trained biomedical language representation model for biomedical text mining", arXiv preprint: arXiv:1901.08746v1 [cs.CL] Jan. 25, 2019, 8 pages.
Lee, et al, "BioBERT: a pre-trained biomedical language representation model for biomedical text mining", Bioinformatics, 2019, 1-7, Sep. 10, 2019, 7 pages.
Liu, et al, "Multi-Task Deep Neural Networks for Natural Language Understanding", arXiv preprint: reparXiv:1901.11504v1 [cs.CL] Jan. 31, 2019, 10 pages.
Liu, et al, "Multi-Task Deep Neural Networks for Natural Language Understanding", arXiv preprint: arXiv:1901.11504v2 [cs.CL] May 30, 2019, 10 pages.
Liu, et al, "RoBERTa: A Robustly Optimized BERT Pretraining Approach", arXiv preprint: arXiv:1907.11692v1 [cs.CL] Jul. 26, 2019, 13 pages.
Peng, et al, "Distantly Supervised Named Entity Recognition using Positive-Unlabeled Learning", arXiv preprint: arXiv:1906.01378v2 [cs.CL] Jun. 11, 2019, 11 pages.
Radford, et al. "Improving language understanding by generative pre-training", 2018, 12 pages.
Tuggener, et al, "Ledgar: A Large-Scale Multilabel Corpus for Text Classification of Legal Provisions in Contracts", Proceedings of the 12th Conference on Language Resources and Evaluation (LREC 2020), pp. 1235-1241, Marseille, May 11-16, 2020, 7 pages.
Vaswani, et al, "Attention Is All You Need", arXiv preprint: arXiv:1706.03762v5 [cs.CL] Dec. 6, 2017, 15 pages.

* cited by examiner

110

200

207

130

210

205

PROVIDE A DOMAIN-SPECIFIC DOCUMENT AND/OR A QUERY

220

RECEIVE THE DOCUMENT AND/OR QUERY FROM THE USER

230

ANALYZE THE DOMAIN-SPECIFIC DOCUMENT OR A QUERY USING THE PRETRAINED LANGUAGE MODEL

240

PERFORM AT LEAST ONE DOMAIN SPECIFIC PROCESSING TASK ON THE DOMAIN-SPECIFIC DOCUMENT AND/OR QUERY

270

250

GENERATE A RESPONSIVE OUTPUT FROM THE PRETRAINED LANGUAGE MODEL

PRESENT THE OUTPUT TO THE USER

260

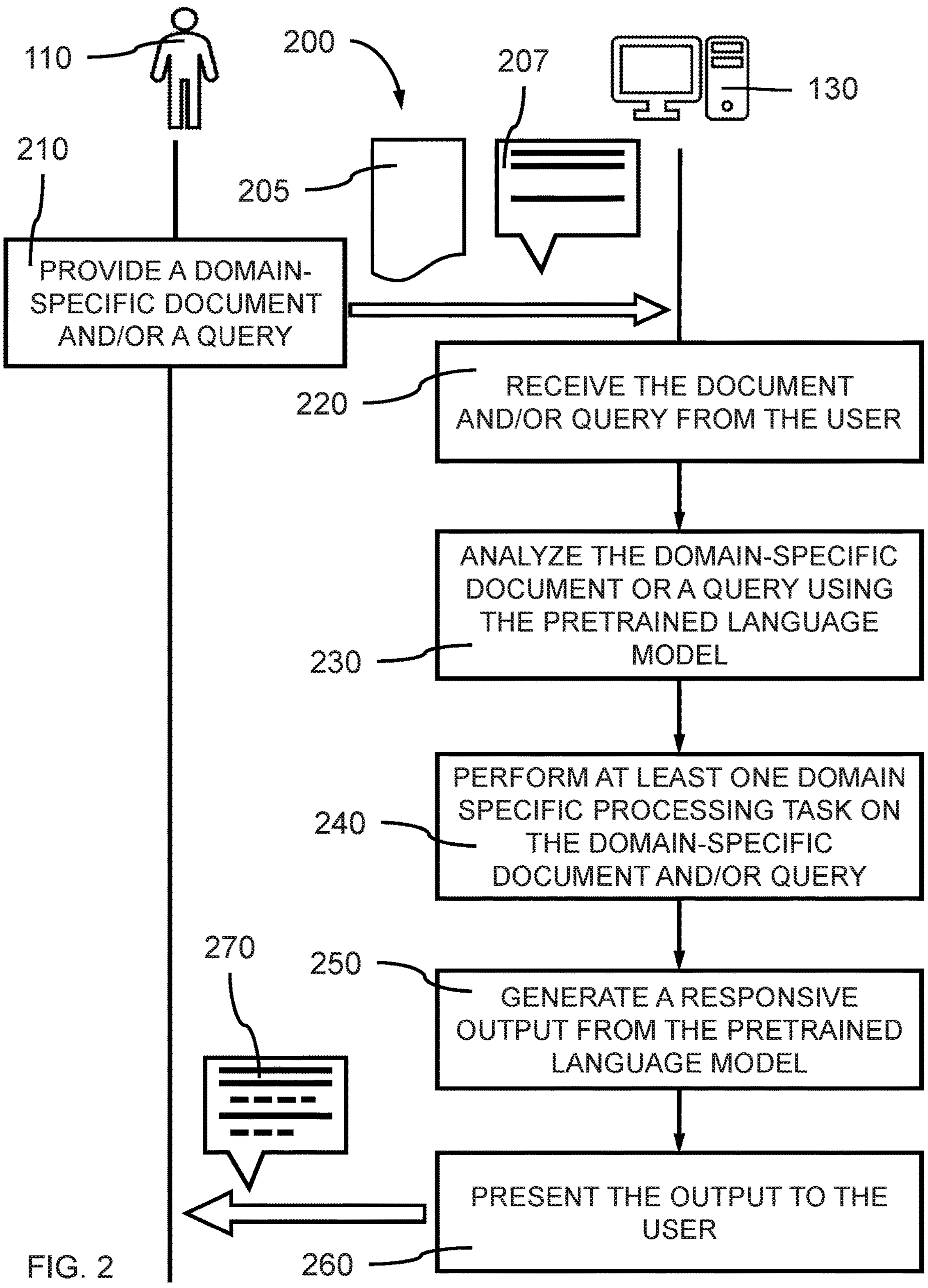

FIG. 2

710   OBTAIN AN UNLABELED TEXT CORPUS

720   GROUP TEXT FRAGMENTS FROM THE TEXT CORPUS BASED ON STATIC TOKEN SIMILARITY

730   CONSTRUCT A GRAPH FOR EACH GROUP OF TEXT FRAGMENTS

740   IDENTIFY AND LABEL TOKENS FORMING THE DYNAMIC SPANS IN THE TEXT CORPUS

750   GENERATE TOKEN-WISE BINARY LABELED TRAINING SET

760   ESTABLISH A PRETRAINING OBJECTIVE THAT DETECTS DYNAMIC PORTIONS

810 — OBTAIN AN UNLABELED TEXT CORPUS

820 — IDENTIFY CLAUSES ASSOCIATED WITH SOFT LABELS IN THE TEXT CORPUS

830 — RETAIN TEXT CLAUSE FROM THE CORPUS ASSOCIATED WITH A SINGLE SOFT LABEL

840 — IDENTIFY AND LABEL INSTANCES AS ANCHOR, POSITIVE, OR NEGATIVE REPRESENTATIONS

850 — GENERATE A LABELED TRAINING DATASET

860 — ESTABLISH A PRETRAINING OBJECTIVE THAT MAPS SEMANTICALLY SIMILAR CLAUSES TO METRICALLY CLOSER POINTS

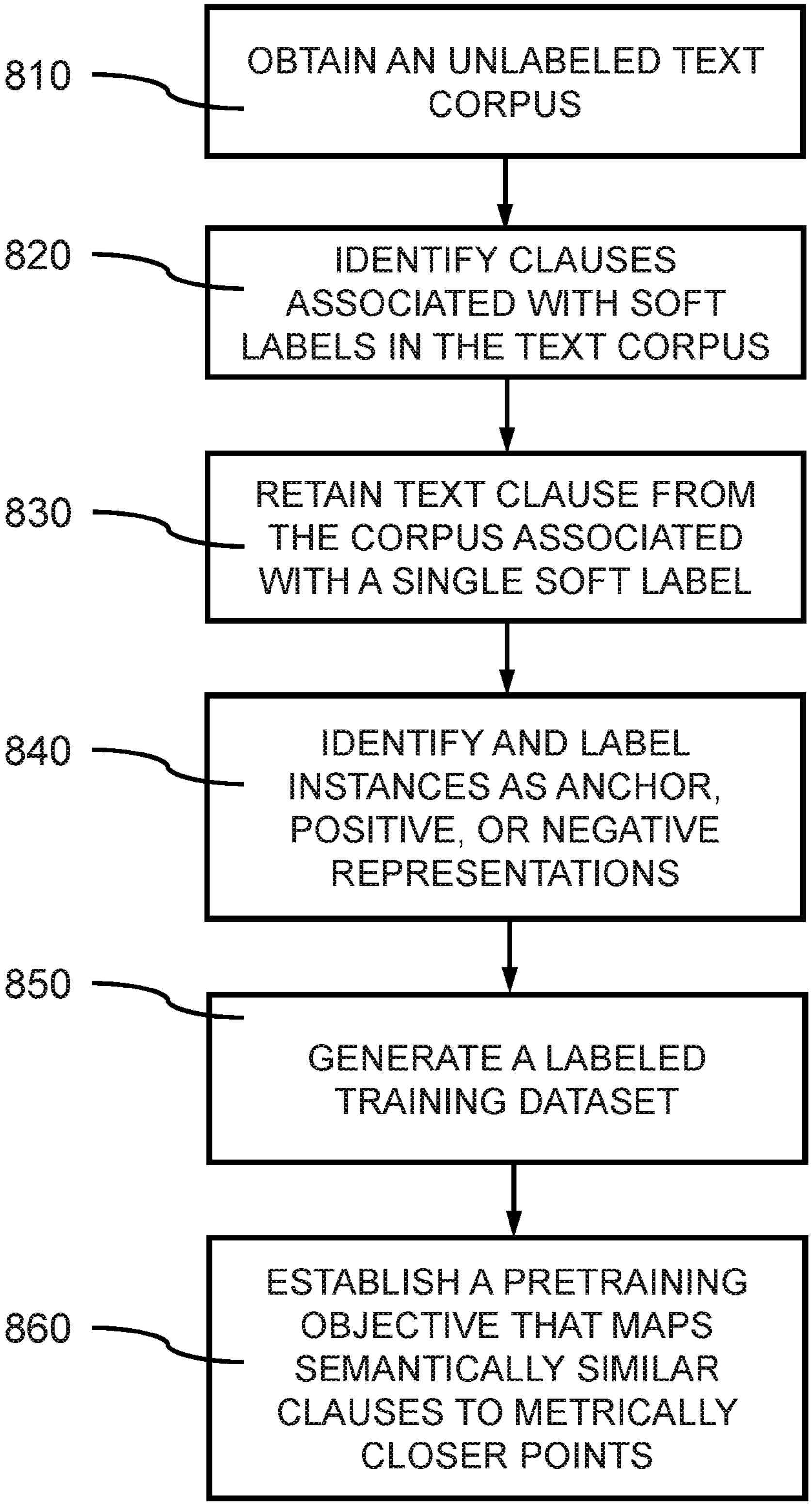

FIG. 8

910 — INITIALIZE A LANGUAGE MODEL WITH WEIGHTS FROM A PRETRAINED DOMAIN-SPECIFIC LANGUAGE MODEL

920 — RANDOMLY SELECT A TRAINING OBJECTIVE AND ASSOCIATED TRAINING DATA SET

930 — SAMPLE A MINI-BATCH OF TRAINING DATA

940 — PERFORM A SINGLE STEP OF GRADIENT DESCENT APPLYING THE RANDOMLY SELECTED OBJECTIVE AND LOSS

950 — REPEAT RANDOM SELECTION OF TASK AND MINI-BATCH TRAINING DATA, AND GRADIENT DECENT STEP

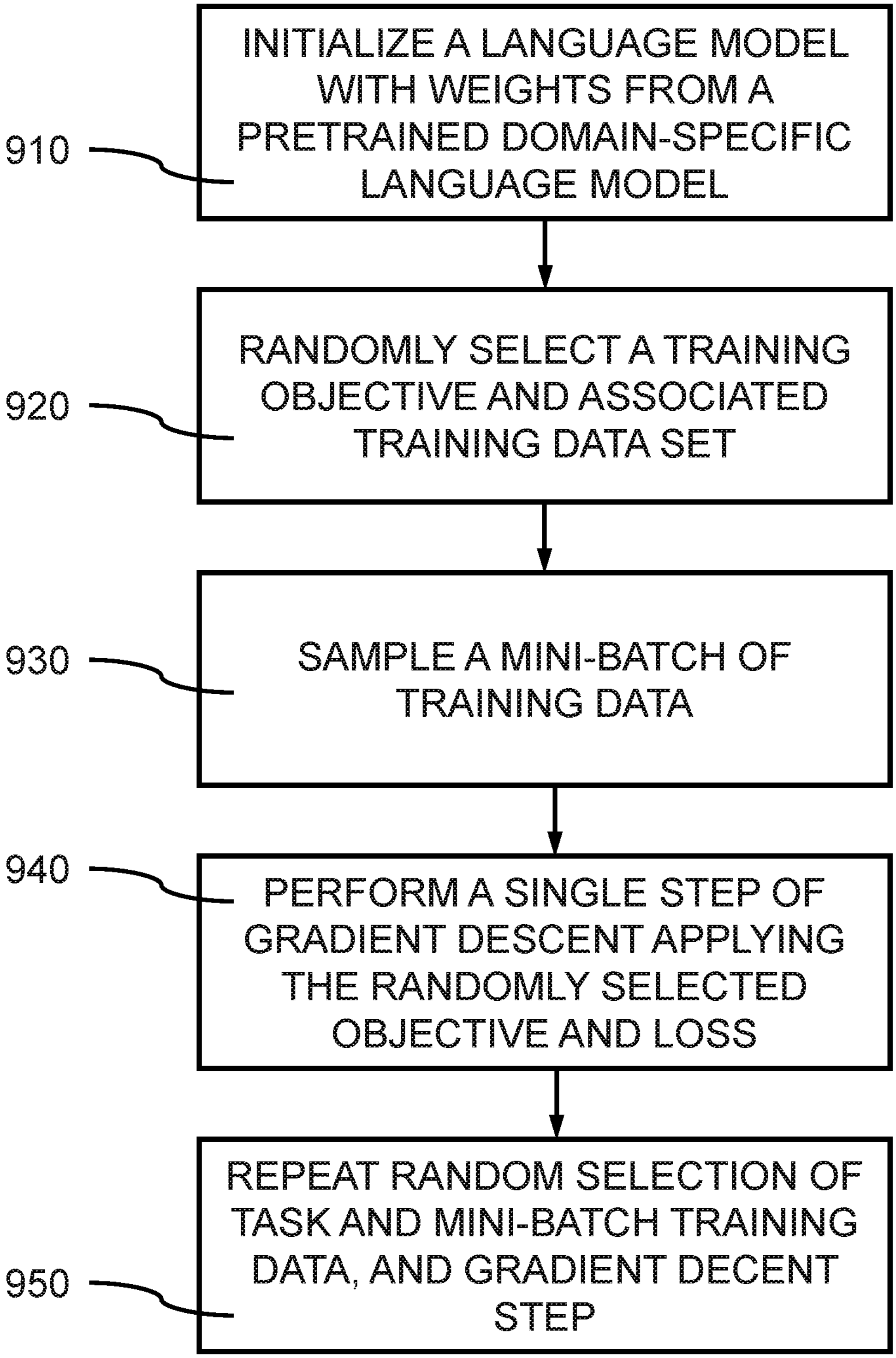

FIG. 9

EXPLOITING DOMAIN-SPECIFIC LANGUAGE CHARACTERISTICS FOR LANGUAGE MODEL PRETRAINING

BACKGROUND

The following relates to training neural network language models for domain-specific applications. Language models can be used for tasks like text classification, sentiment analysis, semantic analysis, textual entailment, named entity recognition (NER), and question answering.

Pre-trained language models with BERT-like architecture, trained using large unlabeled domain-agnostic corpus, can exhibit superior performance in several non-domain-specific Natural Language Processing (NLP) tasks, where the model can learn words generally through pretraining. Such language models can be optimized using a Masked language modeling (MLM) objective to achieve quality results across different domain agnostic NLP tasks. However, direct application of these models to domain-specific downstream tasks can result in sub-par performance due to changes in vocabulary and language style. Fine-tuning approaches can introduce additional task-specific parameters. Alternatively, a model may be trained on the downstream tasks by fine-tuning some or all pre-trained parameters.

SUMMARY

Embodiments of the present disclosure provide a pretraining method to generate a single natural language model that can be used as backbone for building models with enhanced performance across multiple natural language processing tasks in a specific domain, rather than learning separate task-specific high-performance models for each NLP task from scratch. Embodiments of the present disclosure can utilize domain-specific objectives for pretraining and capitalize on domain-specific language characteristics. For example, embodiments of the present disclosure formulate closely aligned domain-specific objectives in addition to domain agnostic objectives like MLM and auto-regression. Embodiments of the present disclosure use the structure of a domain-specific corpus and category labels in the text to affect the representation space. These pretrained language models can achieve better performance for a variety of tasks, than the domain-specific models pre-trained using only domain agnostic objectives (e.g., MLM).

A method, apparatus, non-transitory computer readable medium, and system of training a domain-specific language model are described. One or more aspects of the method, apparatus, non-transitory computer readable medium, and system include obtaining domain-specific training data including a plurality of domain-specific documents having a document structure corresponding to a domain; obtaining domain-agnostic training data including a plurality of documents outside of the domain; and training a language model to perform a domain-specific task based on the domain-specific training data and to perform a domain agnostic task based on the domain-agnostic training data.

A method, apparatus, non-transitory computer readable medium, and system for performing multiple domain-specific tasks using a pretrained language model is provided. One or more aspects of the method, apparatus, non-transitory computer readable medium, and system include receiving a query relating to a document in a domain; generating a domain-specific output based on the query using a language model, wherein the language model is trained to perform a domain-specific task based on training data including a plurality of domain-specific documents having a document structure corresponding to the domain; and transmitting a response to the query based on the domain-specific output.

An apparatus and system for performing multiple domain-specific tasks are described. One or more aspects of the apparatus and system include one or more processors; a memory coupled to and in communication with the one or more processors; and a language model trained to generate a domain-specific output based on a received query using a language model, wherein the language model is trained to perform a domain-specific task based on training data including a plurality of domain-specific documents having a document structure corresponding to the domain.

BRIEF DESCRIPTION OF THE DRAWINGS

FIG. 2 shows a flow diagram for a method of performing multiple domain-specific tasks using a pretrained language model, according to aspects of the present disclosure.

FIG. 8 shows a flow diagram for a method of semantic training data creation, according to aspects of the present disclosure.

FIG. 9 shows flow diagram for a method of training a domain-specific language model using randomly selected training objectives, according to aspects of the present disclosure.

DETAILED DESCRIPTION

Figure 1:
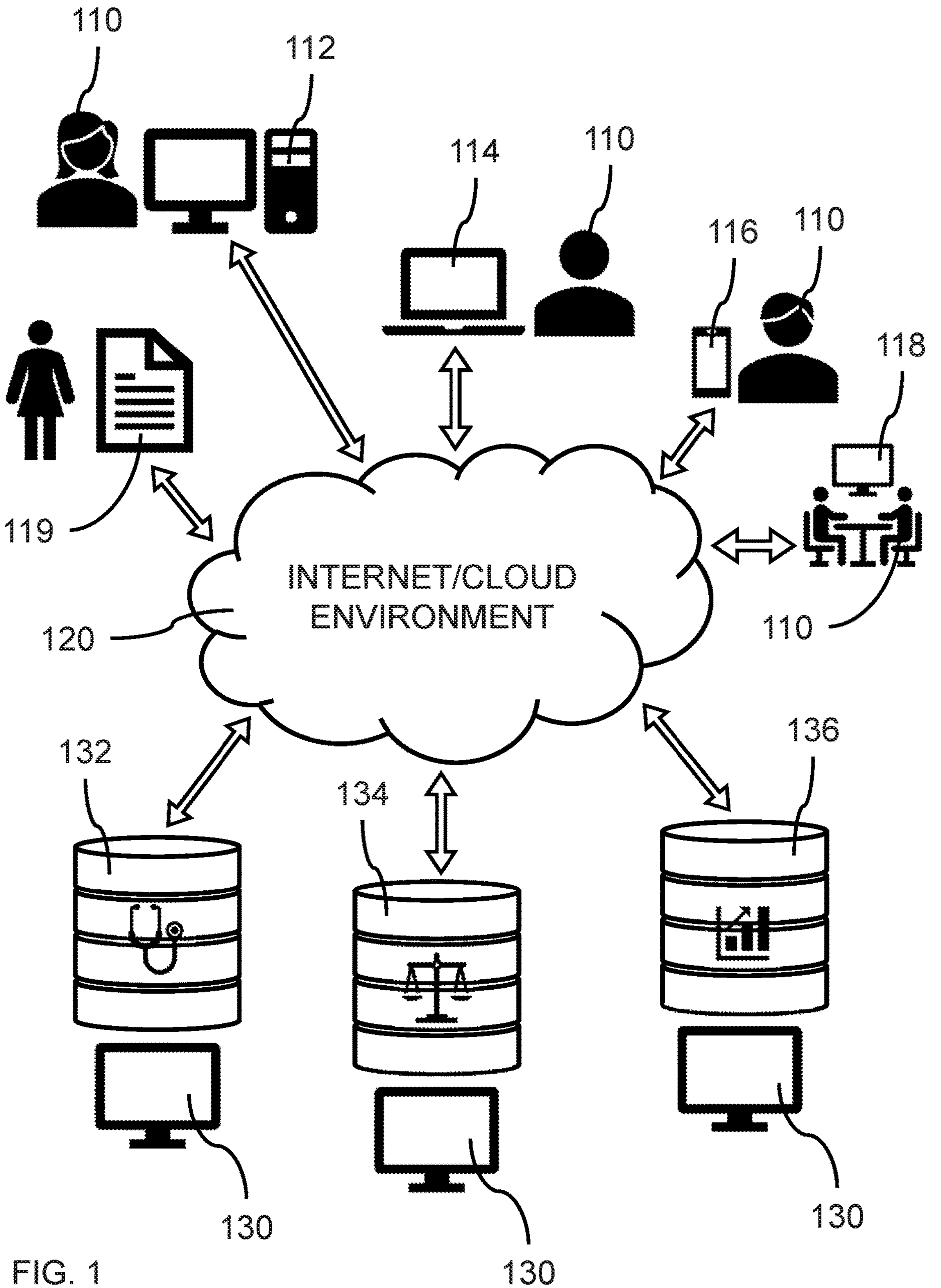
FIG. 1 is an illustrative depiction of a high-level diagram of users interacting with a remote domain-specific natural language processing system through their devices, according to aspects of the present disclosure.

The present disclosure relates to natural language processing (NLP), and exploiting domain-specific language characteristics for language model pretraining, where the specific domain can be the legal domain and the language model can be a legal language model.

In various embodiments, a plurality of pretraining methodologies, for example, masked language modeling (MLM), static/dynamic (positive-unlabeled), and soft label representations, can be used to improve the domain-specific performance of a natural language model by utilizing domain-specific characteristics. Domain-specific pre-training can involve applying a loss function to penalize wrong answers generated for the specific domain being trained. Combinations of the different objectives having different loss functions can be used during pretraining to overcome the deficiencies of a single training objective and loss function.

Different pretrained language model variants can be obtained by incorporating various groupings and subsets of the pretraining objectives and loss functions during pretraining, where pretraining can encompass training that is task agnostic. In various embodiments, all three learning methods can be applied to a natural language model for pretraining to produce a domain-specific natural language model. Different datasets can be generated and used for training each of the objectives.

In various embodiments, a language model pretraining method using objectives derived from domain-specific language characteristics is provided. The pretrained language model can be used for various domain-specific tasks, including legal tasks. Instead of learning a task-specific high-performance model, the objective can train a competent generalist model that can uniformly achieve competitive performance across multiple tasks, including most legal tasks.

In one or more embodiments, a language model pre-trained using domain-specific pretraining objectives that achieves better performance across several legal tasks, as compared to other domain-specific language models, is provided. A pretrained language model can be adapted to domain-specific tasks by utilizing the domain-specific language characteristics.

Embodiments of the present disclosure outperform domain-specific language models, which were trained based on domain-agnostic objectives, such as Masked Language Modelling (MLM). The language model can also achieve better performance than the domain-specific models pre-trained using domain agnostic objectives (i.e., MLM) in a variety of legal tasks, where the multiple-objective strategy provides improvements for each of several downstream tasks. For example, the language models, according to embodiments of the present disclosure, enable clause classification, clause clustering, unusual clause identification, contract type classification, etc., which are tasks in the general domain of contract understanding and intelligence.

Network Architecture

An apparatus and system for performing multiple domain-specific tasks are described. One or more aspects of the apparatus and system include a processor; a memory storing instructions executable by the processor; and a language model trained to perform a domain-specific task and a domain-agnostic task, wherein the domain-specific task relates to a domain in which different documents include similar text based on a same template.

Some examples of the apparatus and method further include a labeling component configured to identify the similar text in a plurality of domain-specific documents and label dynamic text within the similar text to obtain domain-specific training data.

Some examples of the apparatus and method further include a training component configured to train the language model to perform the domain-specific task and the domain-agnostic task based on domain specific training data and domain agnostic training data.

In some embodiments, the language model is trained to perform the domain-specific task using a Positive-Unlabeled (PU) Learning technique. In some embodiments, the language model is trained to perform the domain-agnostic task using a masked language modeling (MLM) technique. In some embodiments, the language model comprises a transformer model Some examples of the apparatus and method further include a response component configured to generate a response to a query based on an output of the language model. In some embodiments, the domain-specific task relates to a legal document domain.

FIG. 1 is an illustrative depiction of a high-level diagram of users interacting with a remote domain-specific natural language processing system through their devices, according to aspects of the present disclosure.

In one or more embodiments, a user 110 can interact with a remote domain-specific natural language processing system 130 through cloud/internet communication 120. A user 110 may interact with the domain-specific natural language processing system 130 using user device(s), for example, a desktop computer 112, a laptop computer 114, a handheld mobile device 116, for example, a smartphone or tablet, a smart tv 118, or document processing system 119, including a scanner, fax machine, or document processing software. In various embodiments, the domain-specific natural language processing system 130 can be, for example, a medical natural language processing system 132, a legal natural language processing system 134, or a financial natural language processing system 136, although other domain-specific natural language processing system 130 are also contemplated.

In various embodiments, the user 110 can communicate with the domain-specific natural language processing system 130 to submit data for analysis, present questions on the specific domain material(s), and receive results and/or answers from the domain-specific NLP system 130.

While legal features are used as a non-limiting exemplary embodiment, embodiments of the claimed invention are not intended to be limited to a legal domain, and can be extended to medical, financial, scientific, and technical domains, as would be recognized by one of ordinary skill in that art. The principles described herein can be applied to other domains that exhibit similar domain-specific characteristics that can be utilized and implemented for pretraining in the manner described herein.

In various embodiments, the cloud 120 is a computer network configured to provide on-demand availability of computer system resources, such as data storage and computing power. In some examples, the cloud 120 provides resources without active management by user 110. The internet/cloud environment 120 can describe data centers available to multiple users over the Internet, where the internet can be a global computer network providing a variety of information and communication facilities. Some large cloud networks have functions distributed over multiple locations from central servers. A server is designated an edge server if it has a direct or close connection to a user 110. In some cases, cloud environment 120 may be limited to a single organization. In other examples, cloud 120 is available to many organizations, where communication may be through the internet. In an example, cloud 120 includes a multi-layer communications network comprising multiple edge routers and core routers. In another example, cloud 120 is based on a local collection of switches in a single physical location. According to some aspects, the internet/cloud environment 120 provides communications between user device(s) 112, 114, 116, 118, and a domain-specific natural language processing system 130, such as medical natural language processing system 132, legal natural language processing system 134, and financial natural language processing system 136.

In various embodiments, the user devices 112, 114, 116, 118, 119, can include software that can communicate and interact with the domain-specific natural language processing system(s) 130, including, but not limited to, submitting a domain-specific document for analysis, submitting a domain-specific question/query, or submitting a judicial decision for analysis.

FIG. 2 shows a flow diagram for a method of performing multiple domain-specific tasks using a pretrained language model, according to aspects of the present disclosure. In various embodiments, a method 200 of performing multiple domain-specific tasks using a pretrained language model is provided.

At operation 210, a domain-specific document 205 and/or a domain-specific query 207 can be provided by a user 110.

At operation 220, a domain-specific natural language processing system 130 can receive the domain-specific document 205 and/or query 207. The received query can relate to a document in the specific domain, for example, a legal, medical, financial, or scientific document domain.

At operation 230, the domain-specific document or the query can be analyzed utilizing a language model pretrained using masked language modeling (MLM) and a domain-specific pretraining objective. The domain-specific document 205 and/or query 207 can be analyzed for domain-specific features including, but not limited to, dynamic portions of text, headings (header)/titles, and semantics.

In various embodiments, generic weights can be used from general language modeling, then MLM can be conducted using domain-specific documents for further pre-training of the language model also using MLM as the training method. MLM, however, can fail to capture certain domain-specific language characteristics because MLM involves domain agnostic training, even though the corpus used for pre-training is domain-specific. By incorporating one or more pretraining objectives that explicitly try to learn the domain-specific language characteristics in addition to such MLM based pretraining, improved performance on domain-specific tasks can be obtained.

In various embodiments, the language model can learn the representation(s) using both multi-task objectives and pre-training. Pretraining can include learning parameters for an encoder through masked language modeling using stochastic gradient descent (SGD). The language model may then be updated/fine-tuned utilizing task-specific objectives for each of multiple tasks. Many existing pre-trained models may undergo further fine-tuning on task-specific data.

In various embodiments, a lexical encoder can map the input tokens to an input embedding vector, where an embedding vector is generated for each of the input tokens, which can be constructed by combining (e.g., pooling) the corresponding word, segment, and positional embeddings. In various embodiments, a multilayer bidirectional Transformer encoder (e.g., Bidirectional Encoder Representations from Transformers (BERT)) can be used to map the input tokens into a sequence of contextual embedding vectors $C \in R^{d \times m}$.

In various embodiments, a pre-training objective function for exploiting domain-specific characteristics includes optimizing the model to distinguish the substitutions (i.e., dynamic portions or spans) from the rest of the static text. An objective and loss function can be used to train the model based on correctly predicting the labels for the dynamic portions of the text. Legal characteristics can be leveraged to formulate the pretraining objectives. Since there may be no labeled dataset that provides such information, the datapoints can be approximately labeled as dynamic portions. A predicted output based on the domain-specific objective of the language model can be compared to the ground truth labels of the domain-specific training data, and the parameters of the language model updated based on the comparison.

At operation 240, at least one domain-specific natural language processing task can be performed on the domain-specific document and/or the query. The pretrained natural language model can be configured to analyze domain-specific language characteristics and perform multiple domain-specific tasks on the domain-specific document and/or query.

Legal Artificial Intelligence (AI) is a collection of AI techniques including Natural Language Processing (NLP) that can assist legal professionals in solving various legal tasks, where application of AI/NLP techniques can solve several tasks in the legal domain (field). Legal natural language processing includes techniques for Legal Judgement Prediction, Legal Entity Recognition and Classification, Legal Question Answering, Automated Legal Review, and Legal Text Classification. Example application of a language model pretrained using novel domain-specific pretraining objective functions include clause classification, clause clustering, unusual clause identification, contract type classification, etc., for contract understanding and intelligence.

The selected task can be from two or more natural language processing tasks, including Legal Judgement Prediction, Legal Entity Recognition and Classification, Legal Question Answering, Automated Legal Review, Legal Text Classification, unusual clause identification, and contract type classification.

At operation 250, an output can be generated by the pretrained language model responsive to the domain-specific document and/or the query, wherein the output can be based on the domain-specific language characteristics. A response component can be configured to generate a response to the query based on an output of the language model.

At operation 260, the output 270 can be presented to the user, for example, on a display screen of a computer system, where the output may answer the user submitted query and/or identify features of the document. A response to the query based on the predicted domain-specific output can be transmitted to the user, for example, through cloud/internet communication 120.

Figure 3:
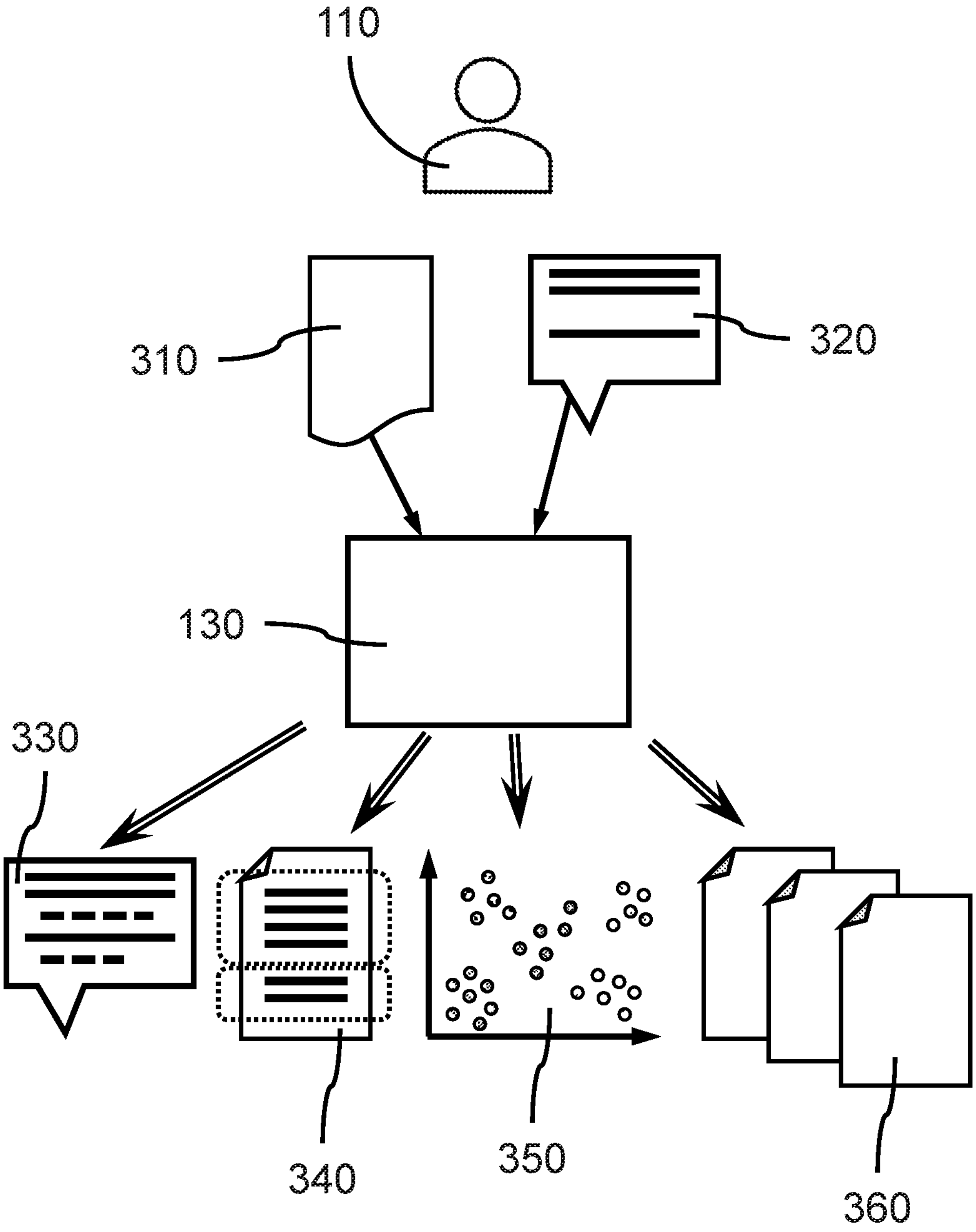
FIG. 3 is an illustrative depiction of a high-level diagram of user inputs to a domain-specific natural language processing system to perform multiple tasks, according to aspects of the present disclosure.

FIG. 3 is an illustrative depiction of a high-level diagram of user inputs to a domain-specific natural language processing system to perform multiple tasks, according to aspects of the present disclosure.

In various embodiments, the user 110 can submit a domain-specific document 310, a domain-specific question 320, or a combination thereof, for example a question about a specific document, to a domain-specific natural language processing system 130, for example, a legal natural language processing system 134, to accomplish one or more domain-specific tasks. The domain-specific tasks can be, for example, legal judgement prediction based on submissions in a trial and a judge's prior reasoning and court decisions, legal entity recognition and classification, for example, identifying legal parties, law firms, attorneys, judges, etc., legal question answering 330, for example, obtaining information about legal terms and actions needed to be taken in response to certain holdings or triggers, knowing the rights/responsibilities for a given entity in a given legal situation, automated legal review, legal text classification, clause classification and unusual clause identification 340, clause clustering 350, legal document type classification 360 (e.g., contracts), etc., for legal document understanding and intelligence.

In various embodiments, legal question answering 330 can utilize NLP to recognize domain-specific questions from a user 110, identify semantic and contextual meaning, and provide a domain-specific response to the question. Legal question answering 330 can include name entity recognition, where a user 110 asks about identification of parties. Clause classification and unusual clause identification 340 can identify types of clauses and whether a clause fails to fall within a classification or is otherwise an outlier. Clause classification and unusual clause identification 340 can include legal text classification, where smaller fragments are identified as being a particular type or class. Clause clustering 350 can utilize clause identification to adjust similar clause types to be closer in a semantic space and further from clauses of other identified types. Outliers and unusual clauses may also appear as individual data points on a clustering map. Legal document type classification 360 may utilize clause classification and unusual clause identification 340 and clause clustering 350 to separate large collections of documents into classes that incorporate different clauses, for example, wills, sales contracts, mergers, etc.

The legal domain differs from the generic corpora in terms of specialized vocabulary, particularly formal syntax, and domain-specific knowledge semantics to the extent that it can be considered a separate 'sub-language'. As a result, the legal domain requires the expertise and skill of legal professionals to understand and process legal-specific tasks like risk analysis, judgement prediction, extraction of rights and responsibilities with concerned party, legal question answering and summarization, etc. However, due to the specialized language syntax, it can take a lot of time and effort to understand and process these tasks even for skilled legal practitioners.

To overcome this, an approach is to pre-train a language model over domain-specific corpora. (Pre-training in AI refers to training a model with one task to help it learn parameter values that can be applied to other tasks.) While there are some domain-specific language models, such models are pre-trained over a large corpus using domain agnostic objectives like Masked Language Modelling (MLM), auto-regression employed in GPT involving likelihood maximization, while generating domain-specific text, etc., which can fail to provide optimal domain-specific performance. For instance, BIOBERT, Clinical BERT, Clinical BIOBERT, and PubMedBERT have achieved moderate results for the biomedical domain-specific tasks by pre-training over domain-specific corpus closely associated with the biomedical domain using a domain agnostic MLM objective. These methods can focus on choosing appropriate corpora for the MLM pretraining and the selection of optimal hyperparameters. MLM can involve masking about 15% of the words during training, and uses a prediction of possibilities for completion versus a ground truth word. BERT learns to associate words with context using words both before and after a mask, where BERT can be trained using a large unlabeled corpus.

While the legal domain is used as a specific example to describe features of the invention embodiments, it is also contemplated that the domain-specific natural language processing system can be applied to other specific domains that have similar characteristics of the domain described herein.

Training Data Creation:

A method, apparatus, non-transitory computer readable medium, and system of training a domain specific language model are described. One or more aspects of the method, apparatus, non-transitory computer readable medium, and system include obtaining training data including domain-specific training data and domain-agnostic training data; generating predicted output using a language model; and training the language model to perform a domain-specific task and a domain agnostic task based on the predicted output and the training data. In some embodiments, the language model is trained using a Positive-Unlabeled (PU) Learning technique The method, apparatus, non-transitory computer readable medium, and system further include obtaining a plurality of domain-specific documents; identifying similar text in the plurality of domain-specific documents; and labeling dynamic text within the similar text to obtain the domain-specific training data.

The method, apparatus, non-transitory computer readable medium, and system further include identifying a header of the similar text; and performing soft label classification based on the header, wherein the domain-specific task is based on the soft label classification. In some embodiments, the domain-agnostic task comprises a masked language modeling (MLM) task.

The method, apparatus, non-transitory computer readable medium, and system further include computing a contrastive learning loss, wherein the language model is trained to perform the domain-specific task based on the contrastive learning loss. In some embodiments, the domain-specific training data and the domain-specific task relate to a domain in which different documents include similar text based on a same template.

Figure 4:
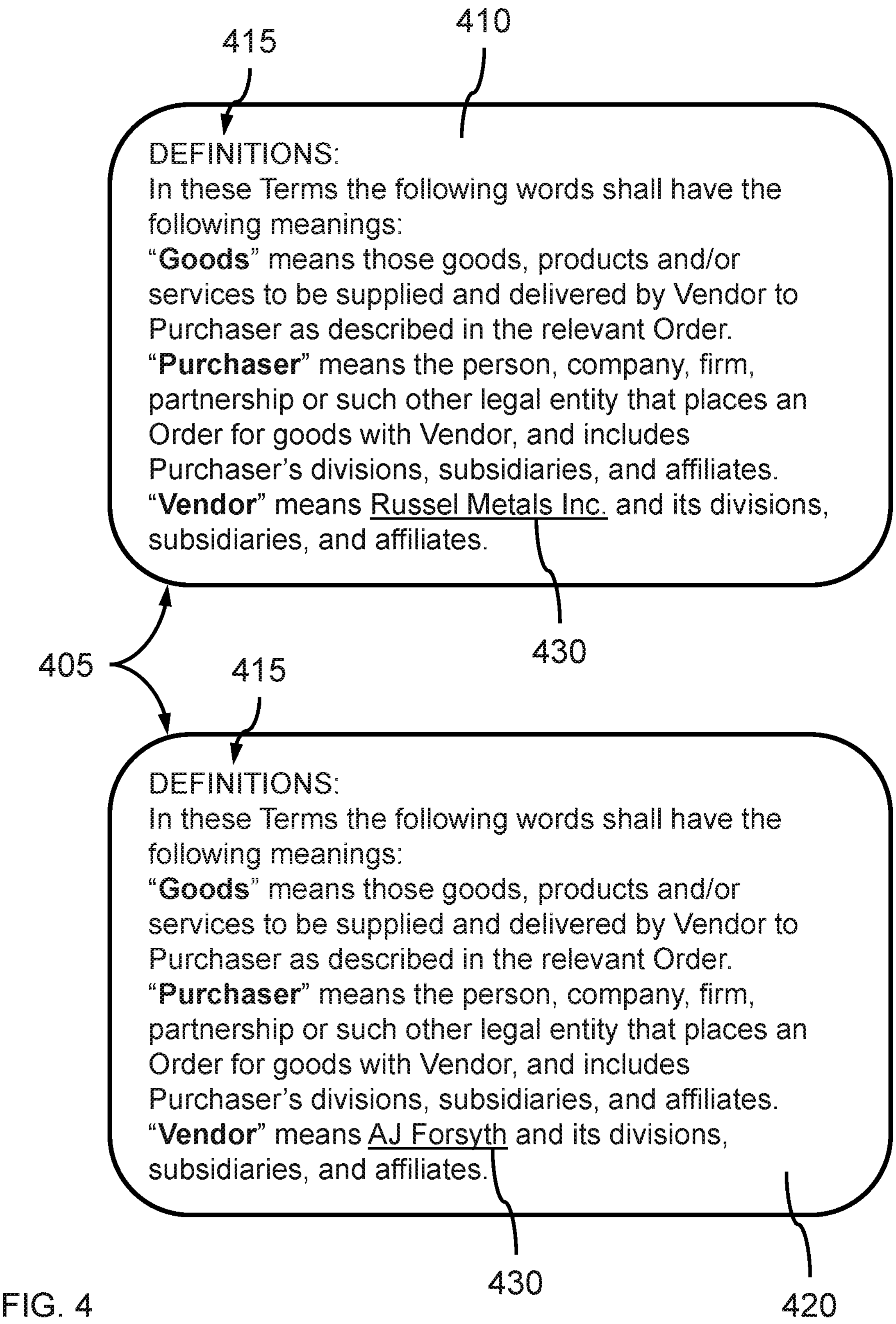
FIG. 4 is an illustrative depiction of standardized clauses containing a name/title/category type and replaced words in a common language format, according to aspects of the present disclosure.

FIG. 4 is an illustrative depiction of standardized clauses containing a name/title/category type and replaced words in a common language format, according to aspects of the present disclosure.

In various embodiments, the specific domain can be treated as a templating language, where the number of consistent words between clauses is above a predetermined threshold. By finding clauses from domain-specific documents that are very similar at the lexical level (with only a few words different, such as person name, address, amounts, dates, etc.), a training data set can be created automatically. Standardized document fragments with placeholders can be referred to as templates. Tokens in the template clauses that remain common across documents can be referred to as static tokens and the tokens that change across documents can be referred to as dynamic tokens.

In a non-limiting exemplary embodiment, two different sales contract clauses 410, 420, for example, may be generated from the same or a similar underlying template 405, that includes an extensive amount (e.g., >90%) of standardized language. The clauses 410, 420 in the contracts may have a name/title 415 associated with them, where the name/title 415 can be the same for both templates/contract clauses. The template 405 can include static portions that remain common across the contract documents and dynamic portions 430 (underlined) that receive specific information in placeholders. The tokens that differ across such clauses can be identified as dynamic, for example, by word-to-word comparisons. The underlined portions signify the identified dynamic portions 430, which can be multiple words entered into a placeholder, associated with the common static text. The tokens in the template-generated clauses that remain common across contract documents can be referred to as static tokens and the values filled into the placeholders can be referred to as dynamic tokens. The dynamic portion 430 in this case is observed to have close correspondence with an organization named entity.

In various embodiments, sales contracts 410, 420, for example, may be from different documents that were not generated from the same template 405, but utilize standard legal terminology that appears to be generated from the same template 405 (e.g., a similar template). Legal documents can tend to use the same language to avoid relitigating the meaning of terms and context. Medical and financial documents can use the same language for technical specificity and conveying the same context and meaning. Consistent financial language may be used to avoid ambiguities.

Legal documents can include clauses that are derived from reusable text fragments with placeholders (e.g., fields that can hold specific information, but can change from occurrence to occurrence). There can be many clauses with similar templatized language. The placeholders can be substituted with appropriate replacements for specific documents (e.g., the names of entities or parties to the legal document, dates, locations, etc.). A pre-training objective for exploiting this characteristic can optimize a language model to distinguish the substitutions from the rest of the text, where the pre-training objective aims to detect the dynamic tokens/spans from text fragments in the legal documents. By finding clauses from contracts that are very similar at a lexical level (e.g., through word-by-word comparison) with only a few words different, such as person name, address, amounts, dates, etc., a training data set can be created automatically.

In various embodiments, the tokens that differ across such clauses can be identified as placeholders and used in pre-training as a part of the pretraining objective. The placeholders can be substituted with appropriate replacement word(s) for each of the specific documents. By studying the language characteristics of a specific domain (e.g., legal, financial, medical, etc.), pretraining objectives that explicitly try to learn these domain-specific characteristics can be utilized to obtain performance improvements for several downstream language processing tasks.

In various embodiments, a software component that implements a dataset curation strategy can be used to classify the tokens appearing in the text as positive for dynamic tokens or unlabeled/undefined for tokens that remain consistent (static) through the text comparison.

In various embodiments, a pre-training objective can utilize the dynamic portions 430, where the dynamic portion 430 is the actual value entered into the placeholders (e.g., fields/variables) from text fragments of the document or template 405, and the static portions. The language model can be pretrained based on predicting the dynamic portions 430 of clauses in a training set, where the parameters of the language model can be updated based on a loss function. The loss function can calculate a loss by comparing the predicted dynamic portions 430 to ground truth dynamic tokens (e.g., computing a contrastive learning loss).

One of the obstacles in utilizing this characteristic in the pre-training objective is the lack of dataset(s) with labeled ground truth dynamic portions; however, dataset(s) with this kind of information may be generated through a dataset curation strategy.

In various embodiments, by finding clauses from a corpus of contracts that are very similar at a lexical level (i.e., with only a few words different, such as person name, address, amounts, dates, etc.), a training data set usable by/for the pre-training objective can be created automatically. In various embodiments, a corpus to be labeled was formed by collecting all the clauses present in the LEDGAR dataset. The LEDGAR Corpus is a collection of labelled legal clauses and provisions, which includes over 700,000 provisions from contracts, and over 104 million tokens.

In various embodiments, contractual documents and agreements can be formed by assembling clauses that define terms and conditions and provide for various provisions. These clauses may be categorized based on the clause name/title/category, and this categorization can be implemented for optimizing the language model to provide a semantic-aware representation scheme. The clauses in the contracts may have a name/title 415 associated with them, for example, at the beginning of a clause or a block of similar clauses. These associated names/titles 415 can be treated as soft labels to provide a semantic understanding to the language model. The language model can learn a representation scheme that maps same category clauses from a data manifold onto metrically closer points in the mapped space. By infusing the ability to generate semantic-aware representation into the model, the language model may offer better performance on sentence-level tasks which assess the model's capability in generating holistic representation.

Figure 5:
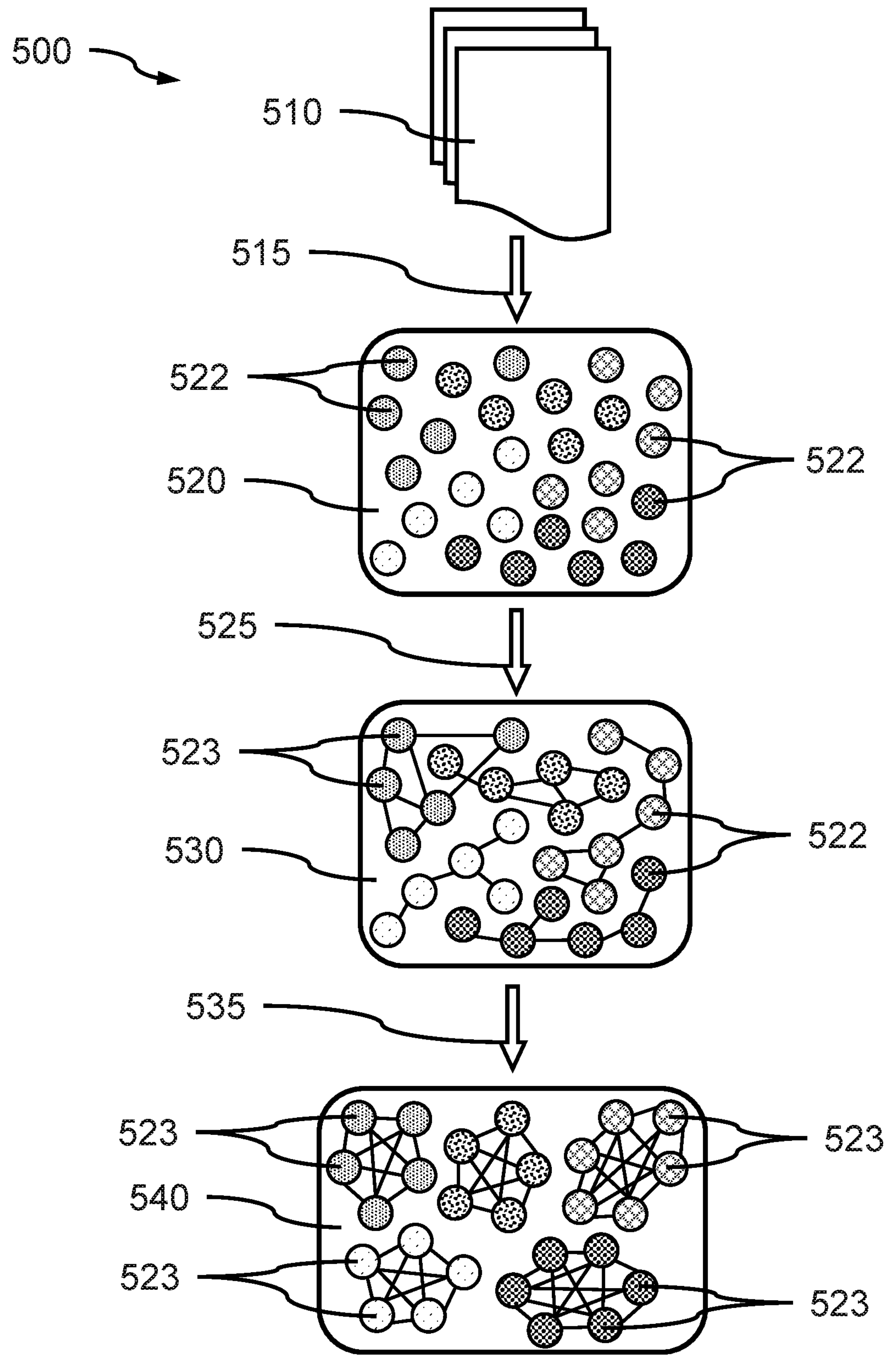
FIG. 5 shows an illustrative depiction of a pipeline employed to annotate data for dynamic portion identification, according to aspects of the present disclosure.

FIG. 5 shows an illustrative depiction of a pipeline employed to annotate data for dynamic portion identification, according to aspects of the present disclosure.

In various embodiments, a dataset curation strategy 500, which can be a preprocessing function, provides data points for the dynamic portions 430. The dataset curation strategy 500 can include two steps: a) grouping data points that have very high lexical similarity and therefore are believed to be generated from a single underlying template; and b) contrasting data points in a pairwise fashion for every group to differentiate the dynamic portion 430 from the static portion. However, there may be inconclusive evidence to classify tokens as static, due to some values (specific information) in the dynamic portions 430 coincidentally being consistent between data points.

In various embodiments, at operation 515 a domain-specific corpus 510 (e.g., LEDGAR) can be segmented, where the legal documents/text making up the corpus 510 can be divided into fragments 520 (e.g., clauses or paragraphs). The different individual fragments forming the data points 522 (represented as shaded circles) can be identified as having similar or different features, (where fragments having similar features have been depicted with the same shading). The fragments are the data points.

In various embodiments, the domain-specific corpus 510 can be the LEDGAR Corpus, which is a collection of labeled legal clauses and provisions. This corpus was crawled from the contracts present on the website of U.S. Securities and Exchange Commission (SEC). The dataset contains many clause instances that fall under multiple labels.

In various embodiments, unlabeled contract provisions (e.g., obtained from LEDGAR corpus) can be clustered using the extent of lexical overlap (e.g., intersection of sets/percentage of word similarity) between them. The set of all unlabeled (unspecified) text fragments can be represented by $$\mathcal{U} = \{u_i\}_{i=1}^{N},$$

where $u_i$ denotes a text fragment in this set.

In various embodiments, at operation 525, clauses having repetitive linguistic structure are believed to be generated from a common source or single template 405, so a similarity between the fragments can be determined using, for example, Minhash-Locality Sensitive Hashing (LSH). In the data curation strategy, the lexical overlap between two data points can be obtained by computing the Jaccard Index between their respective set of all k-Shingles, where a k-Shingle is a consecutive set of k words/tokens.

In various embodiments, each clause is not compared to every other clause due to computational costs and inefficiencies at scale, but through use of the min-hash signature created for each value (clause, paragraph), where the hash value is representative of the clause but independent of the clause length. Naive pairwise computation of a Jaccard Index between every pair of data points can be computationally costly and require significant time to curate the dataset. The min-hash values can then be compared.

In various embodiments, a fast clustering of U by deriving min-Hash signatures for each of the documents may be used. While min-Hash signatures of the $u_i$ text fragments can provide faster computation of an approximate Jaccard index value, a locality sensitive hashing (LSH) can be applied over the min-Hash signatures to derive similarity relations between the elements of U without the explicit computation of the Jaccard Index. Locality sensitive hashing is an algorithmic technique that hashes items with high similarity into the same "buckets."

In various embodiments, the threshold for establishing similarity and a connection between fragments can be set high (e.g., 90% word-to-word similarity between two fragments).

In various embodiments, at operation 530 a graph can be constructed from the result of applying the LSH, where the nodes in this graph are the elements of U. The fragments 522 having identified similarities and separated into "buckets" can be connected to form connected components 523. Connections may be formed from one fragment 522 to one or more other fragments 522 based on the identified similarities. The text-fragments placed within a bucket can be considered as being generated from a single underlying template; edges are therefore added between every pair of corresponding nodes in the graph to make the nodes placed in the same bucket fully connected. The fragments 522 identified as belonging to the same cluster can be made fully connected, where a pair of fragments 522 forming connected components 523 are believed to be similar and connected to all other connected components 523. This process can be repeated for every set of nodes in each bucket. A data point is represented as a node in the graph, so they would be equivalent. Nodes in each bucket would form one connected component.

In various embodiments, at operation 535, the connected components 523 can be clustered, where the data points for the fragments are grouped together. Each pair in a cluster 540 can be contrasted to annotate what is dynamic among them.

In various embodiments, at operation 540 the elements in U can be grouped into different clusters of connected components 523, where any element (fragments 522) in each cluster is believed to be generated from the same template 405. If there was access to the original underlying template 405, the labeling of the elements for the dynamic portion 430 (placeholder) would be trivial; however, because there is not access to such information, every pair of elements (nodes) in a cluster is considered, analyzed, and annotated with labels identifying what is different between each pair. In various embodiments, this can be accomplished using Longest Common Substring based string alignment algorithms (e.g., Google-diff-match-patch library), which provide algorithms to synchronize plain text.

Figure 6:
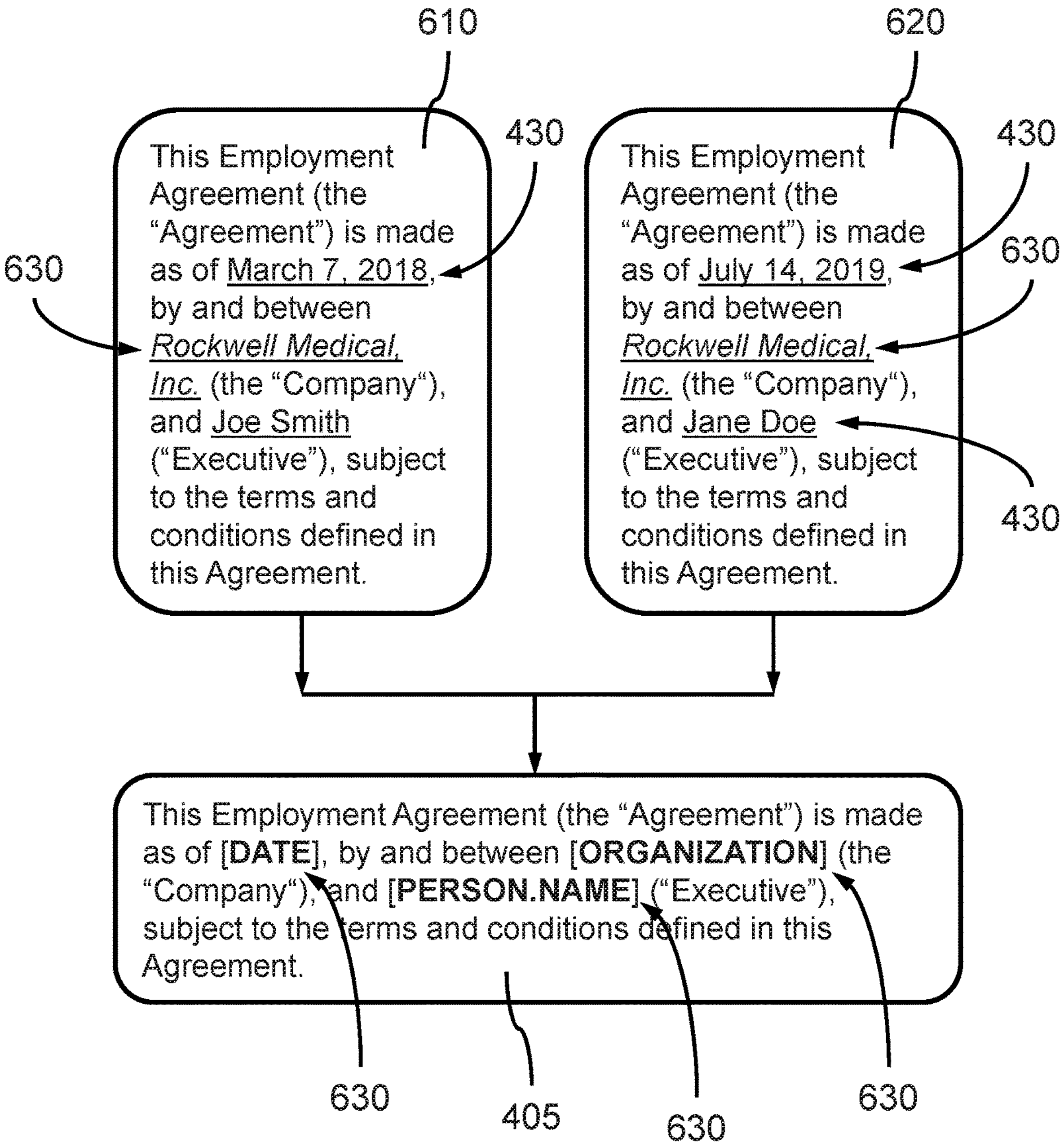
FIG. 6 is an illustrative depiction of two text fragments belonging to a same cluster that have a dynamic portion that is consistent between the text fragments, according to aspects of the present disclosure.

In various embodiments, the dataset curation strategy can generate data points with token-wise binary label annotations. The tokens corresponding to the positive label are regarded as the dynamic portions of the data point. Note that, in this process of labeling, the tokens annotated with a positive label are considered the dynamic portion of the underlying text, but the negative labels for the rest of the tokens are inconclusive in considering them as static. An example to illustrate this is shown in FIG. 6. Therefore, a PU (Positive-Unlabeled) learning scheme can be implemented for identifying the dynamic tokens.

Using this pre-training objective, the language model can generate a holistic representation for a text-fragment that is cognizant of the tokens forming the dynamic portion 430 and the tokens forming the static part of the text, which can provide better contextualized token representation for the task of named-entity recognition (NER).

FIG. 6 is an illustrative depiction of two text fragments belonging to a same cluster that have a dynamic portion that is consistent between the text fragments, according to aspects of the present disclosure.

In various embodiments, two text fragments 610, 620 belonging to a same cluster 540 and believed to be generated from the same template 405 can be inconclusive regarding the pairwise comparison of some text. The process of contrasting may identify and annotate only some of the dynamic portions 430 (underlined) and miss some fields 630 (underlined and italic) that are dynamic yet consistent between the text fragments. Because some dynamic fields 630 may be consistent between elements/nodes of a cluster, such that dynamic fields 630 appear static. Because similarity between the tokens in text fragments 610, 620 may not be determinative of the classification of the associated tokens, clearly dynamic portions 430 can be identified, whereas the rest of the text cannot be regarded as static in its entirety. Tokens that are consistent between text fragments 610, 620 can remain unlabeled or be otherwise identified as inconclusive.

Figure 7:
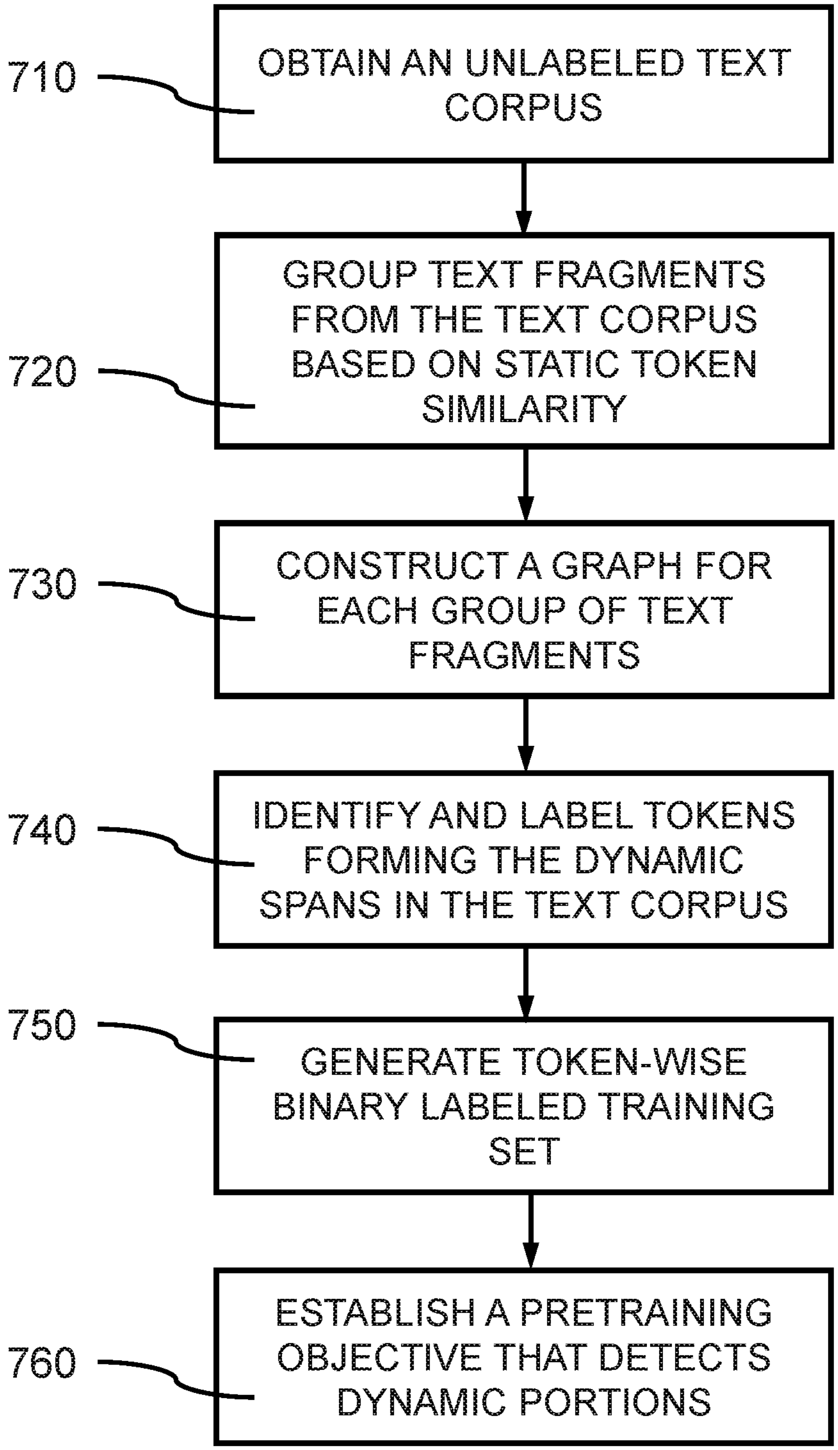
FIG. 7 shows a flow diagram for a method of labeled training data creation, according to aspects of the present disclosure.

FIG. 7 shows a flow diagram for a method of labeled training data creation, according to aspects of the present disclosure.

At operation 710, an unlabeled text corpus for a specific domain can be obtained, where the domain-specific text corpus can include fragments having high word-to-word similarity. The domain-specific text corpus can be for a legal domain, medical domain, financial domain, scientific domain, or technical domain. In various embodiments, the corpus to be labelled can be formed by collecting all the clauses present in the LEDGAR dataset.

At operation 720, the domain-specific text corpus can be separated into text fragments that can be identified as having similar and/or different features. Because a document can have many different clauses, but clauses across documents can be similar, the documents can be separated into clauses for comparison. Similar text in the plurality of domain-specific documents can be identified, where different documents may include similar text based on a same or similar template. Similarity can be determined through a pairwise comparison of text fragments (e.g., clauses, paragraphs, etc.), where similarity can be based on the percentage of consistent (static) tokens between the text fragments, for example, having a high (e.g., 90%-95%) word-to-word similarity.

In various embodiments, the documents can be divided into fragments, for example, clauses and paragraphs. Fragments with similar text can be clustered/grouped. A high threshold can be used to establish similarity of clustered/grouped clauses and paragraphs.

A "data point" can be a tuple ($X_i$, $Y_i$), where $X_i$ represents a text-fragment as the sequence of tokens, $x_{ik}$, where $$\left(X_i = [x_{ik}]_{k=1}^{|X_i|}\right)$$

and $Y_i$ is the corresponding sequence of binary labels assigned to each token, $x_{ik}$ Every word can become a data point in an N-dimensional space.

A data point can also be a soft label classification.

As used herein, "lexical similarity" refers to word-for-word similarity through comparison, rather that semantic similarity (e.g., having the same meaning).

In various embodiments, to make use of the soft labels, a triplet loss objective in a Siamese network and Contrastive loss can be used.

At operation 730, a graph can be constructed between text fragments meeting the similarity threshold, where text fragments can be treated as nodes and similar fragments connected by edges into graphs for the groups.

At operation 740, the tokens forming the domain-specific text corpus can be identified as dynamic based on the comparison of two text fragments in the same graph/group. The tokens that are different between the two fragments can be labeled as dynamic, whereas the tokens that are consistent can be labeled as agnostic or unlabeled.

At operation 750, labels can be applied to each token to form a positive-unlabeled (PU) training set, where the labels can identify a token as positive if dynamic and unlabeled if static between the text fragments.

After applying a Positive-Unlabeled labeling scheme, a token-wise labeled dataset, $$\mathcal{L} = \{(X_i, Y_i)\}_{i=1}^{M},$$

can be obtained. A data point in $\mathcal{L}$ is a tuple ($X_i$, $Y_i$), where $X_i$ represents a text-fragment as a sequence of tokens, $x_{ik}$, it contains, where $$\left(X_i = [x_{ik}]_{k=1}^{|X_i|}\right)$$

and $Y_i$ is the corresponding sequence of positive-unlabeled labels assigned to each token, $x_{ik}$, in $X_i$ in the same order $$\left(Y_i = [y_{ik}]_{k=1}^{|Y_i|}, \text{ where } y_{ik} \in \{0, 1\}\right),$$

that is $y_{ik}$=1 implies that token $x_{ik}$ belongs to the dynamic portion, and $y_{ik}$=0 implies that the corresponding token can belong to any part and there is not enough evidence justifying that it belongs to a particular (e.g., static or dynamic) part. The tokens, $x_{ik}$, identified as dynamic can be labeled as "positive", and the remaining tokens, $x_{ik}$, labeled as neutral, "not positive" or "unlabeled."

At operation 760, a pretraining objective can be established for pretraining the language model, where the domain-specific language model can be trained based on detecting the dynamic portions of text fragments.

Given the positive-unlabeled (PU) dataset, the language model, $\mathcal{M}$, can be trained such that $\mathcal{M}_{dyn}$($X_i$, $x_{ik}$) provides the likelihood that $x_{ik}$ is dynamic. The subscript '$dyn$' denotes the addition of task-specific overhead architecture to the language model for detecting dynamic portions. A binary cross entropy objective may not be directly applied over the token-level predictions, as the negative/agnostic labels in the case do not imply that the corresponding tokens are necessarily static. To overcome this obstacle, the framework of positive-unlabeled learning can be utilized, where all the tokens associated with a positive label are regarded as dynamic and the remaining tokens associated with a negative label, are regarded as unlabeled.

In various embodiments, under this framework, all the positively labeled tokens are collected with their parent text-fragment to form the set, $$\mathcal{X}_p = \{X_i, x_{ip}\}_{i=1}^{n_p},$$

where $x_i$ represents a positively labeled token present in the text fragment $X_i$, and $n_p$ is the number of positive labeled tokens. In various embodiments, this is also repeated for the negatively labeled data points to form the unlabeled set $$\mathcal{X}_u = \{X_j, x_{ju}\}_{j=1}^{n_u},$$

where $n_u$ is the number of unlabeled tokens present in the text fragment $X_j$.

Once there are sufficient data points labelled as positive and unlabeled on a token level, PU learning techniques can be used. The PU dataset can be used for the domain-specific objective learning.

Soft-Label Training Set

FIG. 8 shows a flow diagram for a method of semantic training data creation, according to aspects of the present disclosure.

At operation 810, an unlabeled text corpus for a specific domain can be obtained, where the domain-specific text corpus can include clauses associated with soft labels, such as title/name headings. The domain-specific text corpus can be for a legal domain, medical domain, financial domain, scientific domain, or technical domain. In various embodiments, the text corpus can be formed by a subset of the clauses present in the LEDGAR dataset.

Clauses in domain-specific documents can have similar section headings (also referred to as a header) followed by the individual clauses. In various embodiments, clause titles that are present in legal texts can be used as soft labels for pretraining the language model(s). For example, contracts and legally enforceable documents are somewhat structured and may be segmented into clauses, which are sections of text defining terms, conditions, and important provisions.

Clauses can be categorized into distinct types based on the legal features they address, and often include a name/title indicating the category at the beginning of the clause. The clauses appearing under the same name/title and/or in the same category type can be expected to be closer in the representation space, as compared to clauses that appear under other differently labeled types. For example, two warranties clauses would be expected to be closer to each other both lexically and semantically than one clause under warranties and another clause under exclusions or assignments.

At operation 820, soft labels and associated clauses can be identified in the dataset, where the dataset may contain clause instances with multiple labels. The soft labels can be identified through special formatting, for example, underlining, bolded text, increased font size, etc. For example, LEDGAR includes 12,608 labels and 846,274 provisions, where users are left to select subsets of labels/provisions. The LEDGAR corpus is available as a JSON file, where each line includes a JSON object that holds the attributes: provision, which contains the provision text, label, which holds the extracted labels, and source, which gives the relative path to the contract from which the provision was extracted.

At operation 830, clauses associated with a single soft label are identified and retained for the soft label training dataset. Multiple labels can be associated with each provision (clause) in a corpus, so the set of clauses in the corpus can be searched and filtered to compile a training dataset where each clause is associated with a single soft label. In various embodiments, only the clauses from the corpus which are associated with a single label (roughly 83% of the dataset) have been retained for training.

At operation 840, triplets are identified for the clauses, such that each instance in the training dataset is a triplet ($x_a$, $x_p$, $x_n$), where $x_a$ is an anchor representation, $x_p$ is a positive representation, and $x_n$ is a negative representation. In various embodiments, an anchor, $x_A$ is a paragraph label and $x_B$ is another paragraph label.

At operation 850, a training dataset can be generated by assembling the soft-labeled clauses (provisions) and representations $x_a$, $x_p$, $x_n$, to be used as ground truths.

At operation 860, an objective and loss function can be established for pretraining the language model for soft label (triplet loss) classification, where the domain-specific language model can be trained based on mapping semantically closer input data points onto metrically closer points in $R^d$.

In various embodiments, the representations of the clauses associated with a same label are pulled closer in the mapped space, and the clauses associated with different labels are pushed apart. This is referred to as a Triplet loss, which is a loss function where a reference input called an anchor is compared to a matching input, called positive, and a non-matching input, called negative. The loss function operates to minimize the distance from the anchor to the positive labeled value and maximize the distance from the anchor to the negative labeled value. However, even paragraphs that are associated with the same label can have completely different wording. Unlike the PU learning, the tuples are not a binary classification. Instead, a penalty is applied to the nodes/points if they are not sufficiently far apart.

Language Model Training:

A method, apparatus, non-transitory computer readable medium, and system for performing multiple domain-specific tasks using a pretrained language model is provided. One or more aspects of the method, apparatus, non-transitory computer readable medium, and system include receiving a query relating to a document in a domain; generating a predicted output based on the query using a language model trained to perform a domain-specific task for the domain and a domain-agnostic task; and transmitting a response to the query based on the predicted output.

In some embodiments, the domain comprises legal documents. In some embodiments, the predicted output comprises a legal judgement prediction, a legal entity recognition, a legal question answer, an automated legal review, a legal text classification, an unusual clause identification, or a contract type classification. In some embodiments, the domain comprises scientific or medical documents. In some embodiments, the predicted output comprises a medical diagnosis prediction, a scientific or medical entity recognition, a scientific or medical question answer, a scientific or medical text classification, an unusual clause identification, or a document type classification.

FIG. 9 shows flow diagram for a method of training a domain-specific language model using randomly selected training objectives, according to aspects of the present disclosure.

In various embodiments, at least three objectives, MLM, PU, and Soft-Label (i.e., Triplet), can be used for model pretraining. Other down-stream task training can be considered fine-tuning of the language model.

At operation 910, a language model to be further pretrained is initialized with weights from a pretrained domain-specific language model, for example, the weights from a BERT NLP model pretrained on a domain-specific corpus using MLM can be utilized. The weights from the pretrained NLP model can be further adjusted through additional pretraining using one or more domain-specific objectives including a domain-specific loss function. The pretrained language model can also be further tuned to perform a plurality of domain-specific tasks, where the language model may then perform both one or more domain-specific tasks and one or more domain agnostic tasks.

In various embodiments, the parameters of the shared language model are initialized using the weights of LEGAL-BERT, a domain-specific language model pre-trained using MLM. Thereafter, the model variant performances listed in table 1 are investigated and evaluated by comparing against LEGAL-BERT. The performance of non-domain-specific models such as BERT is not assessed, as the superiority of LEGAL-BERT over BERT has been previously demonstrated for some of the legal downstream tasks. Also, since LEGAL-BERT is already trained on SEC data, which is a superset of LEDGAR dataset, evaluation of the performance of LEGAL-BERT with additional MLM training on LEDGAR was not utilized.

In various embodiments, the dataset for MLM pretraining was obtained by collating 40,000 random text fragments from the SEC contracts. A small dataset can be used for efficiency purposes. The input word sequence of this MLM pretraining model has 15% of the words randomly masked, and the task is to predict what the masked words are.

In various embodiments, the parameters of the language model can be tuned using a multi-task learning algorithm that optimizes the language model over multiple tasks. The language model can be shared across different tasks by employing the same encoder with shared parameters for all the task specific overhead architectures.

At operation 920, one of the plurality of training objectives and associated loss function can be randomly selected for further tuning the pretrained domain-specific language model.

In various embodiments, for each iteration of mini-batch gradient descent optimization, a task, $\mathcal{T}$, can be randomly selected, and a corresponding task specific mini-batch of data, $\mathcal{D}_{\mathcal{T}}$, can be sampled to perform a single step of gradient descent applying one of the preselected task-specific objectives, MLM, PU, or Soft label Classification (also referred to as triplet loss classification (Tri)), with the corresponding loss function.

At operation 930, a mini-batch of training data can be sampled from the available labeled training datasets appropriate for the randomly selected objective. In various embodiments, a mini-batch can be about 16 to about 32 samples, (+/−3 samples). The training data may include the domain-specific training data and domain-agnostic training data.

At operation 940, a single step gradient descent can be performed for the randomly selected objective to adjust the weights of the pretrained language model. Predicted outputs can be generated for the training data and used for comparison with ground truth values, where the outputs can be predicted based on the model.

In various embodiments, the PU learning objective optimizes the model parameters for the detection of dynamic portions by minimizing the following objective function:

$$\mathcal{L}_{PU}(\mathcal{M}_{dyn}, \mathcal{X}_p, \mathcal{X}_u) = \frac{1}{n_u}\sum\nolimits_{(X_u,x_u)\in\mathcal{X}_u} l(\mathcal{M}_{dyn}(X_u, x_u), 0) + \frac{\pi_p}{n_p}\sum\nolimits_{(X_p,x_p)\in\mathcal{X}_p} l(\mathcal{M}_{dyn}(X_p, x_p), 1) - l(\mathcal{M}_{dyn}(X_p, x_p), 0)\Big);$$

where l is a positive-valued loss function that penalizes the distance between its arguments, and $\pi_p \in [0,1]$ is a hyperparameter.

The loss function score between the inferred dynamic portions and the ground truth dynamic portions can be used to adjust the parameters of the language model.

In various embodiments, the soft label classification training objective optimizes the adaptation of the original language model to generate a representation for a given sentence.

Given a language model $\mathcal{M}$, $\mathcal{M}_{rep}$ denotes task specific adaptation of the original language model to generate representation(s) for a given sentence. This can be a task of metric learning, where the goal is to learn a function, $\mathcal{M}_{rep}(\cdot)$: $\mathcal{X} \rightarrow \mathbb{R}^d$ that maps semantically closer input data points onto metrically closer points in $R^d$, where $R^d$ is the d-dimension space where each dimension is a real number (i.e., a vector of d real numbers), for example, BERT would use a 768 dimensional embeddings, so d=768 for BERT. Here, $\mathcal{X}$ denotes the domain of input clauses/provisions. While other objectives involving classification can yield competitive performance, in various embodiments the triplet-margin loss, $l_{tri}$, is used for learning this representation scheme owing to the superior performance in many representation learning tasks.

In various embodiments, the pretrained transformer encoder captures the contextual information for each word via self-attention, and generates a token embedding that defines a data point for that token. The language model can learn the domain-specific vocabulary and context through pretraining.

Under the triplet-loss formulation, every instance in the training dataset is a triplet ($x_a$, $x_p$, $x_n$), where the model tries to make the distance between the representations of $x_a$ (anchor) and $x_p$ (positive) smaller than that between $x_a$ and $x_n$ (negative) by at least a margin, m. Mathematically, the loss function $l_{tri}$ is defined as follows:

$$l_{tri}(x_a, x_p, x_n) = [m + D(\mathcal{M}_{rep}(x_a), \mathcal{M}_{rep}(x_p)) - D(\mathcal{M}_{rep}(x_a), \mathcal{M}_{rep}(x_n))]_+;$$

where m is a predetermined threshold value that determines the distance between pairs, and + indicates that only the positive values are taken. When calculating the triplet loss, the anchor and the positive representations should be closer than m, or be moved closer. If the value is negative, the value is treated as 0 (i.e., max of the calculated value and 0). If the calculated value is positive, then the model parameters are adjusted to move the representation value, $x_p$ or $x_n$ closer or further from the anchor, $x_a$, as appropriate, to move the calculated value to 0 or negative.

In the above equation, D(. , .):$R^d \times R^d \rightarrow R$ denotes a metric function measuring distances in the mapped space. For example, when training the language model using the triplet loss function, K=4 classes and P=4 data points can be sampled for each sampled class in an iteration. Thereafter, the minimization objective can be obtained by summing the loss for every triplet from the sampled data points, such that the anchor data point, $x_a$, and the positive data point, $x_p$, in each triplet belongs to the same class and the negative data point belongs to a different class resulting in PK×(P−1)×P (K−1) summands.

In various embodiments, four (4) classes can be chosen to sample clauses, where four samples can be selected for each of the four classes. The samples of one of the selected classes can be designated as anchors, $x_a$. An additional four samples can be randomly selected from one of the previously chosen classes for training positive representations, $x_p$, for the classes, and four samples can be randomly selected from a class not previously chosen as the anchors, $x_a$, for training negative representations, $x_n$. The clauses selected from the same class(es) are used to train the positive representations and the clauses selected from a different class type are used to train negative representations, where each data point includes the here types of representation ($x_a$, $x_p$, $x_n$). The training samples can include ground truth values to calculate a loss during training. The model parameters can be updated based on the comparison of the predicted result to the ground truth using the loss function.

At operation 950, another one of the plurality of domain-specific objectives can be randomly selected for further tuning of the language model, and another task-specific mini-batch of labeled training data can be sampled from the available labeled trained datasets to repeat the training. In various embodiments, the training is not conducted in a set pattern or sequence of learning objectives and/or dataset samples. In various embodiments, all of the training objectives are used to train the language model, where all of the training objectives are used in a random order. In various embodiments, all of the samples of the datasets are used for training, where the training samples can be selected in a random order for each of the randomly selected objectives. Knowledge learned from previous tasks can be used to help learn a new task. This can be utilized to generate a language model able to perform multiple domain-specific tasks, as well as domain agnostic tasks, where the pretrained language model can be shared across different tasks by employing the same encoder with shared parameters for all the task-specific overhead architectures.

In various embodiments, the loss function can be applied to the output of a decoder of the language model.

In a non-limiting exemplary embodiment, it took 32 hours to pretrain the model with best hyperparameter settings when only 40,000 data points for MLM are used, the model instance pretrained over the total SEC corpus consumed 800 hours. A HuggingFace Transformer was used for both pretraining and experimental analysis.

Training and Implementation Results:

In this subsection, the performance of the model (Legal Bert (LB)) with additional pretrained using PU learning (LB-PU) and binary classification (LB-BC) are compared for named entity recognition (NER) and dynamic part identification (DPI).

The NER adaptation of the Contract Understanding Atticus Dataset (CUAD) is used. CUAD labels the contracting-party associated with each contract. This is used for constructing a NER dataset with contracting-party span annotations for each data point. This dataset includes 16,636 training, 2,000 validation and 10,000 testing samples.

As the dataset, curated for pretraining the language model for dynamic part identification, was approximately labeled, a few text fragments were manually annotated by specifying the dynamic portions using the above-defined definition. This manual annotation furnished 132 training instances, 32 development instances and 50 testing instances. The performance was reported by computing the F1-Score between the inferred spans and the ground truth dynamic portions.

TABLE 1

| Model Name | CUAD-NER | DPI | MULTI-EURLEX | CONTRACT DISCOVERY |
|---|---|---|---|---|
| LEGAL-BERT | 0.7266 | 0.7107 | 0.7535 | 0.4430 |
| LB-PU | 0.7355 | 0.8115 | 0.7488 | 0.0413 |
| LB-PU-MLM | 0.7427 | 0.8057 | 0.7451 | 0.2551 |
| LB-TRI | 0.7325 | 0.7572 | 0.7566 | 0.4994 |
| LB-TRI-MLM | 0.7503 | 0.7653 | 0.7567 | 0.5049 |
| LB-PU-TRI | 0.7320 | 0.8059 | 0.7513 | 0.5020 |
| LB-PU-TRI-MLM | 0.7596 | 0.8208 | 0.7574 | 0.5079 |

Table 1 shows performance results of various legal domain tasks given in terms of F1-Scores for CUAD-NER and DPI tasks, mean of F1-Scores for MULTI-EURLEX tasks for Level 1, 2 and 3, and soft F1-Score for Contract-Discovery task (Averaged for 5 runs). Higher Scores are better.

The results shown in Table 1 justifies the utilization of the learning objective(s), where PU, TRI, and combinations with MLM demonstrate improvements across tasks compared to LEGAL-BERT.

The model pretrained using domain-specific objectives achieves better performance than LEGAL-BERT (LB) alone for all the tasks. The models pretrained using PU (LB-PU and LB-PU-MLM) improves the performance for token-level tasks like CUAD-NER and DPI, but achieves poorer performance for other tasks. As these models only involve objectives at the token level, they offer inferior representations at the level of sentences/text-fragments as compared to other models, which explains the poor performance in tasks like MULTIEURLEX and Contract-Discovery. The models trained using a triplet loss/soft label objective (LB-TRI and LB-TRI-MLM) achieves better performance than LEGAL-BERT for all the tasks. This justifies the inclusion of the objective for learning semantic-aware representation scheme. It is also observed that inclusion of MLM for the model variants almost always improves the downstream performance. This indicates the usefulness of having a domain-agnostic objective like MLM in the overall pretraining objective. The model pretrained using all the objectives (LB-PU-TRI-MLM) achieves the best/competitive performance for most of the tasks, as shown below.

Figure 10:
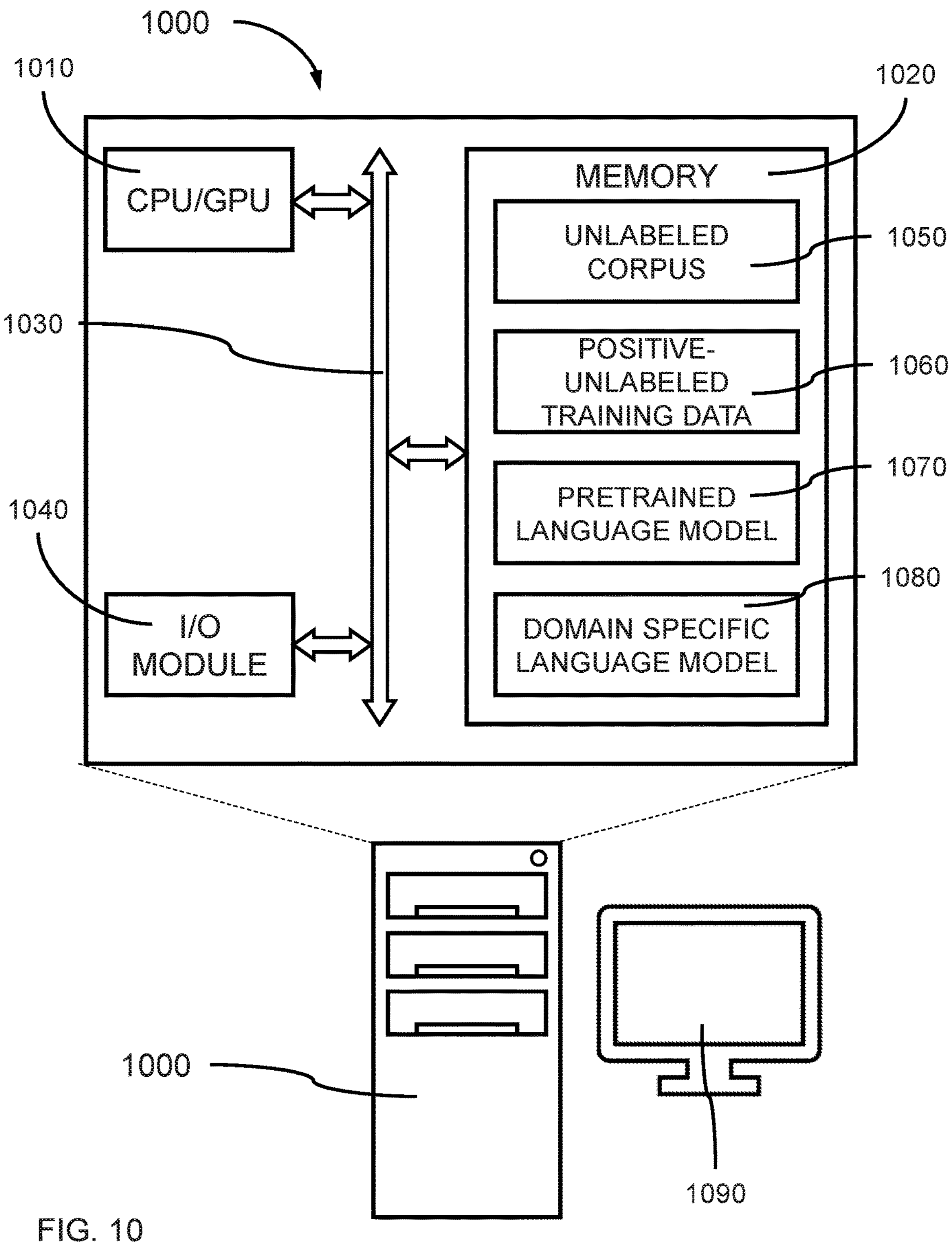
FIG. 10 shows an example of a domain-specific natural language processing system according to aspects of the present disclosure.

FIG. 10 shows an example of a domain-specific natural language processing system according to aspects of the present disclosure.

In various embodiments, a computer system 1000 can be configured to perform the operations described above and illustrated in FIGS. 1-9.

In various embodiments, the computer system 1000 can include one or more processors 1010, for example, central processing units (CPUs), graphics processing units (GPUs), application specific integrated circuits (ASICS), memory 1020, for example, read only memory (ROM), random access memory (RAM), storage memory (e.g., hard disk drive/magnetic memory, optical memory (e.g., CD, DVD)), where the one or more processors 1010 can be in communication with the memory 1020 over a bus 1030. In various embodiments, the computer system 1000 can include an input/output (I/O) module 1040 that is configured to interface and communicate with peripheral devices connected to the computer system 1000, including a display screen 1090.

In various embodiments, an unlabeled corpus 1050 can be stored in memory 1020, where the unlabeled corpus 1050 can be a domain-specific training corpus, for example, a legal corpus including legal documents and/or clauses. In various embodiments, the unlabeled corpus 1050 can be used to create the labeled domain-specific training data 1060 through PU Classification or Binary Classification of the unlabeled corpus 1050.

In various embodiments, a pretrained language model 1070 can be stored in the memory 1020, where the pretrained language model can be domain-specific, for example, LEGAL-BERT, training using MLM. The pretrained language model 1070 can be further pretrained using multiple training objectives to create a domain-specific language model 1080. The domain-specific language model 1080 may be further tuned to create a task specific language model, that can be stored in memory 1020. The pretrained language model can be further tuned to perform a plurality of domain-specific tasks, as well as a domain agnostic task.

In various embodiments, the domain-specific language model 1080 can be trained through Positive-Unlabeled training and/or Binary Classification using the positive-unlabeled domain-specific training data 1060 to perform multiple domain-specific tasks.

Figure 11:
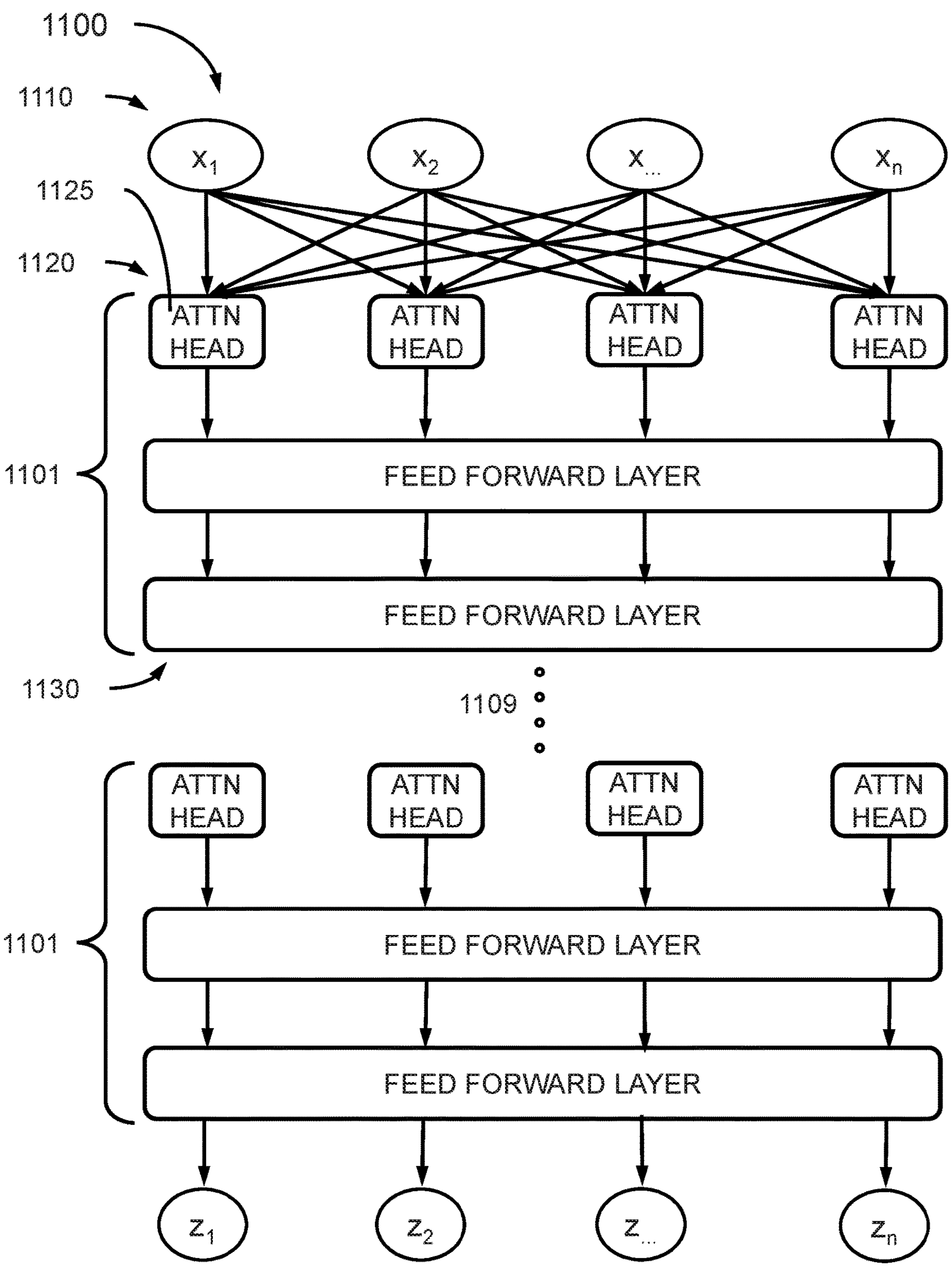
FIG. 11 shows an example of an encoder type natural language processing neural network, according to aspects of the present disclosure.

FIG. 11 shows an example of an encoder type natural language processing neural network, according to aspects of the present disclosure.

An encoder 1100 can learn how to output a target sequence using both an input sequence and the target sequence. The Transformer processes the input sequence words in parallel, where the language model comprises a transformer model.

The encoder input 1110 combines an embedding layer that encodes the meaning of the word and a position encoding layer that identifies the position of the word. An embedding vector captures the meaning of a word. Because all words in a sequence are input in parallel, the position information is lost, but added back separately in this manner. Position encoding uses an encoding size that is equal to the embedding size that can be added to an embedding matrix. A word embedding layer can be a lookup table that identifies a learned vector representation of each word.

An input sequence is converted into Embeddings with Position Encoding and fed to the first layer of the Encoder 1100. The Encoder produces an encoded representation (vector) of this input sequence. A first Encoder 1101 in a stack of multiple encoders 1109 receives input from the embedding and position encoding.

A multi-head Attention module is present in every Encoder layer 1101 in the Encoder stack 1109. Each Attention Head 1125 is repeated several times in parallel. Each Encoder layer 1101 has a multi-head attention layer 1120 and a feed-forward layer 1130, where the multi-head attention layer takes its input in the form of three parameters, known as the Query, Key, and Value. The Encoder input 1110 is passed to all three parameters. This provides several similar Attention calculations and scores that can be combined. The Query, Key, and Value are each passed through separate Linear layers, each with their own weights, producing three results called Q, K, and V respectively. A single data matrix is used for the Query, Key, and Value, with logically separate sections of the matrix for each Attention head 1125. These three results then combined together using an Attention formula to form an Attention Score for each word in the sequence. The attention weights can be multiplied by the value vector to get an output vector. The attention mechanism can have an infinite window to reference from.

The output can go through layer normalization.

Self-attention relates each word in the input sequence to every other word. Self-attention provides the model with more information about each word's meaning, which helps properly associate each word with other words in the input sequence. Transformers can include multiple attention scores for each word.

The feed-forward layer includes fully connected linear layers with a ReLU activation in between each pair. The feedforward layer is used to project the attention outputs.

The output of the encoder 1100 can be predictions, for example, name entity recognition predictions.

Figure 12:
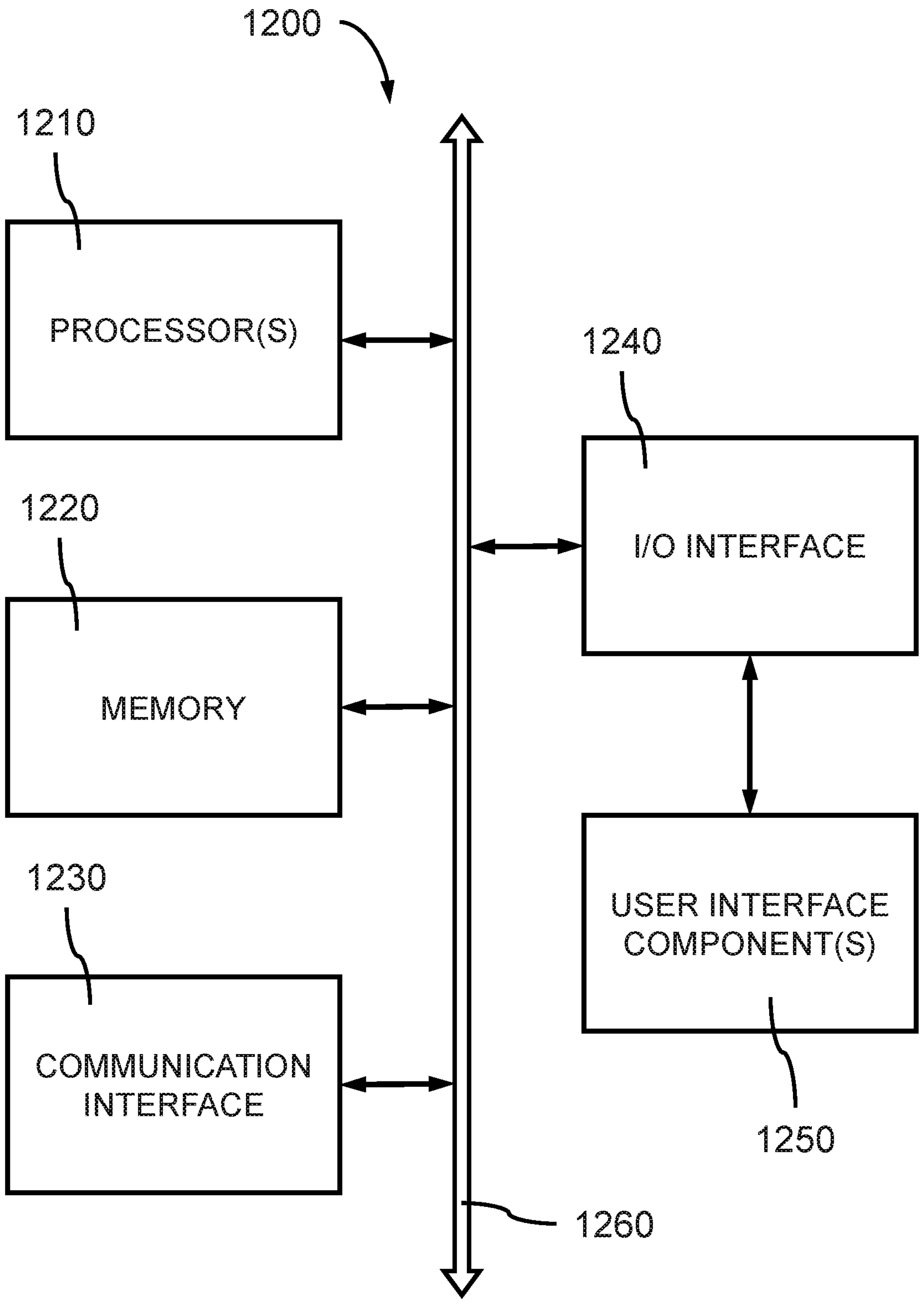
FIG. 12 shows an example of a computing device for image generation, according to aspects of the present disclosure.

FIG. 12 shows an example of a computing device for image generation, according to aspects of the present disclosure.

In various embodiments, the computing device 1200 includes processor(s) 1210, memory subsystem 1220, communication interface 1230, I/O interface 1240, user interface component(s) 1250, and channel 1260.

In various embodiments, computing device 1200 is an example of, or includes aspects of, domain-specific natural language processing system 130 of FIGS. 1-3 and 10. In some embodiments, computing device 1200 includes one or more processors 1210 that can execute instructions stored in memory subsystem 1220 for identifying an original document including domain-specific content and identifying and labeling parts of the document text.

In various embodiments, computing device 1200 includes one or more processors 1210. In various embodiments, a processor can be an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor 1210 is configured to operate a memory array using a memory controller. In other cases, a memory controller is integrated into a processor 1210. In some cases, a processor 1210 is configured to execute computer-readable instructions stored in a memory to perform various functions. In some embodiments, a processor 1210 includes special purpose components for modem processing, baseband processing, digital signal processing, or transmission processing.

A processor 1210 may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

In various embodiments, memory subsystem 1220 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory 1220 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1230 operates at a boundary between communicating entities (such as computing device 1200, one or more user devices, a cloud, and one or more databases) and channel 1260 (e.g., bus), and can record and process communications. In some cases, communication interface 1230 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1240 is controlled by an I/O controller to manage input and output signals for computing device 1200. In some cases, I/O interface 1240 manages peripherals not integrated into computing device 1200. In some cases, I/O interface 1240 represents a physical connection or a port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a user interface component, including, but not limited to, a modem, a keyboard, a mouse, a touchscreen, or a similar device. In some cases, the I/O controller is implemented as a component of a processor. In some cases, a user interacts with a device via I/O interface 1340 or via hardware components controlled by the I/O controller.

According to some aspects, user interface component(s) 1250 enable a user to interact with computing device 1200. In some cases, user interface component(s) 1250 include an audio device, such as an external speaker system, an external display device such as a display screen 1090, an input device (e.g., a remote-control device interfaced with a user interface directly or through the I/O controller), or a combination thereof. In some cases, user interface component(s) 1250 include a GUI.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining domain-specific training data including a plurality of domain-specific documents having a document structure corresponding to a domain;

obtaining domain-agnostic training data including a plurality of documents outside of the domain; and training a language model to perform a domain-specific task and a domain-agnostic task by randomly selecting a training objective from a set of candidate training objectives, wherein the set of candidate training objectives comprises at least one of a Positive-Unlabeled (PU) Learning objective, a soft label classification objective, a masked language modeling (MLM), and an auto-regression objective, wherein the language model is trained to perform the domain-specific task using the Positive-Unlabeled (PU) Learning or the soft label classification objective based on the domain-specific training data, and wherein the language model is trained to perform the domain-agnostic task using the masked language modeling (MLM) or the auto-regression objective based on the domain-agnostic training data.

2. The method of claim 1, further comprising:

identifying similar text in the plurality of domain-specific documents; and labeling dynamic text within the similar text to obtain the domain-specific training data.

3. The method of claim 2, further comprising:

identifying a header of the similar text; and performing soft label classification based on the header, wherein the domain-specific task is based on the soft label classification.

4. The method of claim 1, wherein:

the domain-agnostic task comprises an MLM task.

5. The method of claim 1, further comprising:

computing a contrastive learning loss, wherein the language model is trained to perform the domain-specific task based on the contrastive learning loss.

6. The method of claim 1, wherein:

the domain-specific training data and the domain-specific task relate to the domain in which different documents include similar text based on a same template.

7. A method comprising:

receiving a query relating to a document in a domain;

generating a domain-specific output based on the query using a language model, wherein the language model is trained to perform a domain-specific task and a domain-agnostic task by randomly selecting a training objective from a set of candidate training objectives, wherein the set of candidate training objectives comprises at least one of a Positive-Unlabeled (PU) Learning objective, a soft label classification objective, a masked language modeling (MLM), and an auto-regression objective, wherein the language model is trained to perform the domain-specific task using the Positive-Unlabeled (PU) Learning or the soft label classification objective based on domain-specific training data, wherein the language model is trained to perform the domain-agnostic task using the masked language modeling (MLM) or the auto-regression objective based on domain-agnostic training data, and wherein the domain-specific training data includes a plurality of domain-specific documents having a document structure corresponding to the domain; and transmitting a response to the query based on the domain-specific output.

8. The method of claim 7, wherein:

the domain-agnostic training data includes domain-agnostic documents.

9. The method of claim 7, wherein:

the domain comprises legal documents.

10. The method of claim 9, wherein:

the domain-specific output comprises a legal judgement prediction, a legal entity recognition, a legal question answer, an automated legal review, a legal text classification, an unusual clause identification, or a contract type classification.

11. The method of claim 7, wherein:

the domain comprises scientific or medical documents and the domain-specific output comprises a medical diagnosis prediction, a scientific or medical entity recognition, a scientific or medical question answer, a scientific or medical text classification, an unusual clause identification, or a document type classification.

12. A computer system comprising:

one or more processors;

a memory coupled to and in communication with the one or more processors wherein the one or more processors in communication with the memory are configured to perform operations comprising:

obtaining domain-specific training data including a plurality of domain-specific documents having a document structure corresponding to a domain;

obtaining domain-agnostic training data including a plurality of documents outside of the domain; and training a language model to perform a domain-specific task and a domain-agnostic task by randomly selecting a training objective from a set of candidate training objectives, wherein the set of candidate training objectives comprises at least one of a Positive-Unlabeled (PU) Learning objective, a soft label classification objective, a masked language modeling (MLM), and an auto-regression objective, wherein the language model is trained to perform the domain-specific task using the Positive-Unlabeled (PU) Learning or the soft label classification objective based on the domain-specific training data, and wherein the language model is trained to perform the domain-agnostic task using the masked language modeling (MLM) or the auto-regression objective based on the domain-agnostic training data.

13. The computer system of claim 12, wherein the one or more processors in communication with the memory are configured to perform operations further comprising:

identifying similar text in the plurality of domain-specific documents and label dynamic text within the similar text to obtain the domain-specific training data.

14. The computer system of claim 12, wherein:

the domain-agnostic training data includes domain agnostic documents.

15. The computer system of claim 14, wherein:

the domain-agnostic task comprises an MLM task.

16. The computer system of claim 12, wherein:

the language model comprises a transformer model.

17. The computer system of claim 12, wherein the one or more processors in communication with the memory are configured to perform operations further comprising:

generating a response to a received query based on an output of the language model, and transmit the response to the received query based on a domain-specific output.

18. The computer system of claim 12, wherein:

the domain-specific task relates to a legal document domain.

* * * * *